US005878268A

United States Patent [19]
Hagersten

[11] Patent Number: 5,878,268
[45] Date of Patent: *Mar. 2, 1999

[54] MULTIPROCESSING SYSTEM CONFIGURED TO STORE COHERENCY STATE WITHIN MULTIPLE SUBNODES OF A PROCESSING NODE

[75] Inventor: Erik E. Hagersten, Palo Alto, Calif.

[73] Assignee: Sun Microsystems, Inc.

[*] Notice: This patent issued on a continued prosecution application filed under 37 CFR 1.53(d), and is subject to the twenty year patent term provisions of 35 U.S.C. 154(a)(2).

[21] Appl. No.: 674,274

[22] Filed: Jul. 1, 1996

[51] Int. Cl.$^6$ .................................................. G06F 15/16
[52] U.S. Cl. ............................................... 395/800.28
[58] Field of Search ...................... 395/800.28, 800.29, 395/800.3, 379

[56] References Cited

U.S. PATENT DOCUMENTS

| | | | |
|---|---|---|---|
| 4,648,030 | 3/1987 | Bomba et al. | 395/468 |
| 5,428,803 | 6/1995 | Chen et al. | 395/800.29 |
| 5,446,841 | 8/1995 | Kitano et al. | 395/800.29 |
| 5,522,058 | 5/1996 | Iwasa et al. | 395/472 |
| 5,577,204 | 11/1996 | Brewer et al. | 395/800.29 |
| 5,606,686 | 2/1997 | Tarui et al. | 395/448 |
| 5,613,071 | 3/1997 | Rankin et al. | 395/610 |

OTHER PUBLICATIONS

Cox et al., "Adaptive Cache Coherency for Detecting Migratory Shared Data," Proc. 20th Annual Symposium on Computer Architecture, May 1993, pp. 98–108.

Stenström et al., "An Adaptive Cache Coherence Protocol Optimized for Migratory Sharing," Proc. 20th Annual Symposium on Computer Architecture, May 1993 IEEE, pp. 109–118.

Wolf–Dietrich Weber et al., "Analysis of Cache Invalidation Patterns in Multiprocessors", Computer Systems Laboratory, Stanford University, CA, pp. 243–256 date unknown.

Kourosh et al., "Two Techniques to Enhance the Performance of Memory Consistency Models," 1991 International Conference on Parallel Processing, pp. 1–10.

Li et al., "Memory Coherence in Shared Virtual Memory Systems," 1986 ACM, pp. 229–239.

(List continued on next page.)

*Primary Examiner*—Richard L. Ellis
*Attorney, Agent, or Firm*—Conley, Rose & Tayon, PC; B. Noel Kivlin

[57] ABSTRACT

A computer system including one or more processing nodes, each of which includes one or more subnodes is provided. One of the subnodes (the controller subnode) manages the interface between the processing node and the remainder of the computer system. Other subnodes (snooper subnodes) are employed to store access rights for coherency units within the memory. The processing node's memory is logically divided into portions, and each subnode stores access rights for a particular memory portion. When a transaction is initiated within the processing node, the subnode storing the access rights for the coherency unit affected by the transaction analyzes the access rights and determines if the transaction may complete locally within the processing node. If coherency activity is required, the subnode asserts an ignore signal causing the transaction to be omitted while coherency activity is performed to acquire sufficient access rights. The access rights are updated concurrent with reissue of a transaction for which coherency activity is performed. In this manner, the updated access rights are available to subsequent transactions even though the access rights may be stored in a different subnode than the controller subnode (which performs the reissue transaction). In one embodiment, the updated access rights are conveyed within one of the address phases of the reissue transaction. A bytemask field within one of the address phases is used.

21 Claims, 21 Drawing Sheets

OTHER PUBLICATIONS

D. Lenoski, PhD, "The Description and Analysis of DASH: A Scalable Directory–Based Multiprocessor," *DASH Prototype System*, Dec. 1991, pp. 36–56.

Hagersten et al. "Simple COMA Node Implementations, " Ashley Saulsbury and Anders Landin Swedish Institute of Computer Science, 12 pages date unknown.

Saulsbury et al., "An Argument for Simple COMA," Swedish Institute of Computer Science, 10 pages date unknown.

Hagersten et al., "Simple COMA," Ashley Saulsbury and Anders Landin Swedish Institute of Computer Science, July 1993, pp. 233–259.

Lenoski et al., *The Stanford Dash Multiprocessor*, Mar. 1992, pp. 63–79, IEEE Computer.

Lenoski et al., *The DASH Prototype: Logic Overhead and Performance*, pp. 41–61, IEEE Transactions on Parallel and Distributed Systems, Vol. 4, No. 1, Jan. 1993.

Lenoski et al., *Design of Scalable Shared–Memory Multiprocessors: The DASH Approach*, pp. 62–67, IEEE 1990.

| Demand Code | Demand Type | Origin |
|---|---|---|
| RTS | Read to Share | H |
| RTO | Read to Own | H |
| RS | Read Stream | H |
| INV | Invalidate | H |
| ADM | Administrative | H |

FIG. 10

| Trans | Mtag | Req. | D | D' | D-O | D-S | R-H | R-OS | R-SS | Comp |
|---|---|---|---|---|---|---|---|---|---|---|
| RTS | i | RTS | m,o,s | - | - | - | ACK | - | - | CMP |
| RTS | i | RTS | i | s | RTS | - | - | D | - | CMP |
| RTS | n | RTSN | m,o | - | RTS | - | - | D | - | CMP |
| RTS | n | RTSN | s,i | s | RTS | - | - | D | - | CMP |
| RTO | o,s,i | RTO | m | - | - | - | ACK | - | - | CMP |
| RTO | o,s,i | RTO | o,s | m | INV | INV | - | ACK | ACK | CMP |
| RTO | o,s,i | RTO | i | m | RTO | INV | - | D | ACK | CMP |
| RTO | n | RTON | any | m | RTO | INV | - | D | ACK | CMP |
| RS | i | RS | m,o,s | - | - | - | ACK | - | - | CMP |
| RS | i | RS | i | - | RS | - | - | D | - | CMP |
| RS | n | RSN | any | - | RS | - | - | D | - | CMP |
| WS | o,s,i | INV | any | m | INV | INV | - | ACK | ACK | CMP |
| WS | n | WS | any | i | INV | INV | - | ACK | ACK | CMP_W |
| WB | n | WB | m,o | s | - | - | ACK | - | - | CMP_W |
| WB | n | WB | s,i | - | - | - | NACK | - | - | CMP |
| INT | - | INT | - | - | - | - | ACK | - | - | CMP_D |
| INT | - | INT | - | - | - | - | NACK | - | - | CMP |
| RIO | - | RIO | - | - | - | - | ANM | - | - | CMP |
| RIO | - | RIO | - | - | - | - | D | - | - | CMP |
| RBIO | - | RBIO | - | - | - | - | ANM | - | - | CMP |
| RBIO | - | RBIO | - | - | - | - | D | - | - | CMP |
| WIO | - | WIO | - | - | - | - | ACK | - | - | CMP_D |
| WBIO | - | WBIO | - | - | - | - | ACK | - | - | CMP_D |
| ADM | - | ADM | - | - | - | ADM | - | - | ACK | CMP |

FIG. 13

| P | M15 | M14 | M13 | M12 | M11 | M10 | M9 | M8 | M7 | M6 | M5 | M4 | M3 | M2 | M1 | M0 |

400

| MTAG Code (Binary) | State |
|---|---|
| 00 | Invalid |
| 01 | Shared |
| 10 | Owned |
| 11 | Modified |

MULTIPROCESSING SYSTEM CONFIGURED TO STORE COHERENCY STATE WITHIN MULTIPLE SUBNODES OF A PROCESSING NODE

BACKGROUND OF THE INVENTION

1. Field of the Invention

This invention relates to the field of multiprocessor computer systems and, more particularly, to storing coherency states within multiple subnodes of processing nodes in distributed shared memory multiprocessing computer systems.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another structure for multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

Many distributed shared memory systems suffer from a limitation upon the memory which may be included within a node. The limitation arises not from the number of memory modules (such as dynamic random access memory, or DRAM, modules which are popular in the industry) which may be configured into a node to form the memory, but instead arises from the amount of memory which may be used to store the access rights of the node to a particular coherency unit within the memory. In order to maintain system-wide memory coherency, the access rights granted to a particular node must be respected by that node. However, the node typically employs high speed internal communications, such that the access rights must by accessible very quickly. DRAM is typically not suitable for high speed access. Instead, static random access memory (SRAM) modules are typically used to store the access rights.

While SRAM modules may respond with speeds suitable for use in storing access rights, SRAM modules suffer from other drawbacks. SRAM modules are not fabricated with the densities typified by DRAM. In other words, a much larger number of SRAM modules must be used to store the same number of bits as a particular number of DRAM modules.

Unfortunately, the lack of density in SRAM modules leads to increased pinouts on modules housing the control logic which interfaces to the SRAM modules in order to store, retrieve, and analyze access rights corresponding to a coherency unit accessed by a transaction occurring within the node. The number of SRAM modules which may be used is therefore limited by the number of pins available on the control logic modules. Hence, the number of access rights (and therefore the number of coherency units) which may be stored in the node is limited. Additionally, SRAM modules are significantly more expensive then DRAM modules. In order to minimize the cost of the computer system, it is important to minimize the number of SRAM modules included.

For at least the above reasons, the amount of memory needed to store access rights may limit the amount of main memory which may be included within the node. Still further, if less than the maximum amount of memory is included in a node, it is desirable to reduce the memory dedicated to storing access rights accordingly. In addition, it is desirable to be able to upgrade the amount of memory in a given node subsequent to manufacture of the computer system. Therefore, the amount of memory used for storing access rights must be similarly increasable.

SUMMARY OF THE INVENTION

The problems outlined above are in large part solved by a computer system in accordance with the present invention. The computer system includes one or more processing nodes, each of which includes one or more subnodes. One of the subnodes (the controller subnode) manages the interface between the processing node and the remainder of the computer system. Other subnodes (snooper subnodes) are employed to store access rights for coherency units within the memory. The processing node's memory is logically divided into portions, and each subnode stores access rights for a particular memory portion. When a transaction is initiated within the processing node, the subnode storing the access rights for the coherency unit affected by the transaction analyzes the access rights and determines if the transaction may complete locally within the processing node. If coherency activity is required, the subnode asserts an ignore signal causing the transaction to be delayed while coherency activity is performed to acquire sufficient access rights.

The access rights are updated concurrent with reissue of a transaction for which coherency activity is performed. In this manner, the updated access rights are available to subsequent transactions even though the access rights may be stored in a different subnode than the controller subnode (which performs the reissue transaction). In one embodiment, the updated access rights are conveyed within one of the address phases of the reissue transaction. A bytemask field within one of the address phases is used.

By dividing the access rights storage into multiple subnodes, subnodes may be added to increase the number of access rights which may be stored within a processing node. Consequently, the amount of memory (measured in coherency units) may be increased beyond the number of coherency units manageable by one subnode. Advantageously, the computer system exhibits a high degree of flexibility and reconfigurability. For example, the computer system may be purchased with a small amount of memory and later upgraded to a larger amount of memory relatively easily.

Additionally, the division of access rights storage solves the physical problems of storing the access rights in fast but sparse SRAM-type memory. Each subnode may be configured with a certain number of banks of SRAM (for example, two). When the number of access rights to be stored requires more than the certain number of banks, then another subnode may be added. In this manner, the number of signal lines to which the control logic within any given subnode connects is limited to a smaller number than if a single subnode were used. Advantageously, the control logic may be use commercially available packaging since the number of pins required is minimized. Still further, the fast SRAM may be used, satisfying speed requirements for access with during high speed intranode communications.

Broadly speaking, the present invention contemplates a method for completing a transaction in a processing node of a multiprocessing computer system. The transaction is reissued within the processing node upon completion of coherency activity performed with respect to the transaction. Concurrently, a new coherency state corresponding to a coherency unit affected by the transaction is broadcast. The coherency state is recorded in a position within a table of coherency states. The position corresponds to the coherency unit.

The present invention further contemplates a system interface comprising a first subnode and a second subnode. The first subnode is configured to communicate between a local bus of a processing node and a network. Coupled to the local bus, the second subnode is configured to store a first plurality of coherency states corresponding to a first plurality of coherency units stored within the processing node.

The present invention still further contemplates a computer system comprising a network and a first processing node. The first processing node is coupled to the network and includes a controller subnode and a snooper subnode. The controller subnode is configured to effectuate communication upon the network and to reissue a transaction for which the communication is effectuated upon completion of the communication. Furthermore, the controller subnode is configured to broadcast a coherency state achieved via the communication. The snooper subnode is configured to store a first plurality of coherency states corresponding to a first plurality of coherency units stored within the first processing node. Additionally, the snooper subnode is configured to capture the coherency state broadcast by the controller subnode if the coherency state is one of the plurality of coherency states.

BRIEF DESCRIPTION OF THE DRAWINGS

Other objects and advantages of the invention will become apparent upon reading the following detailed description and upon reference to the accompanying drawings in which:

FIG. 10 is a table listing demand types according to one embodiment of the system interface.

FIG. 13 is a table describing coherency operations in response to various operations performed by a processor, according to one embodiment of the system interface.

FIG. 20 is a diagram depicting an exemplary MTAG layout employed by one embodiment of the symmetric multiprocessing node shown in FIG. 14.

Figure 1:
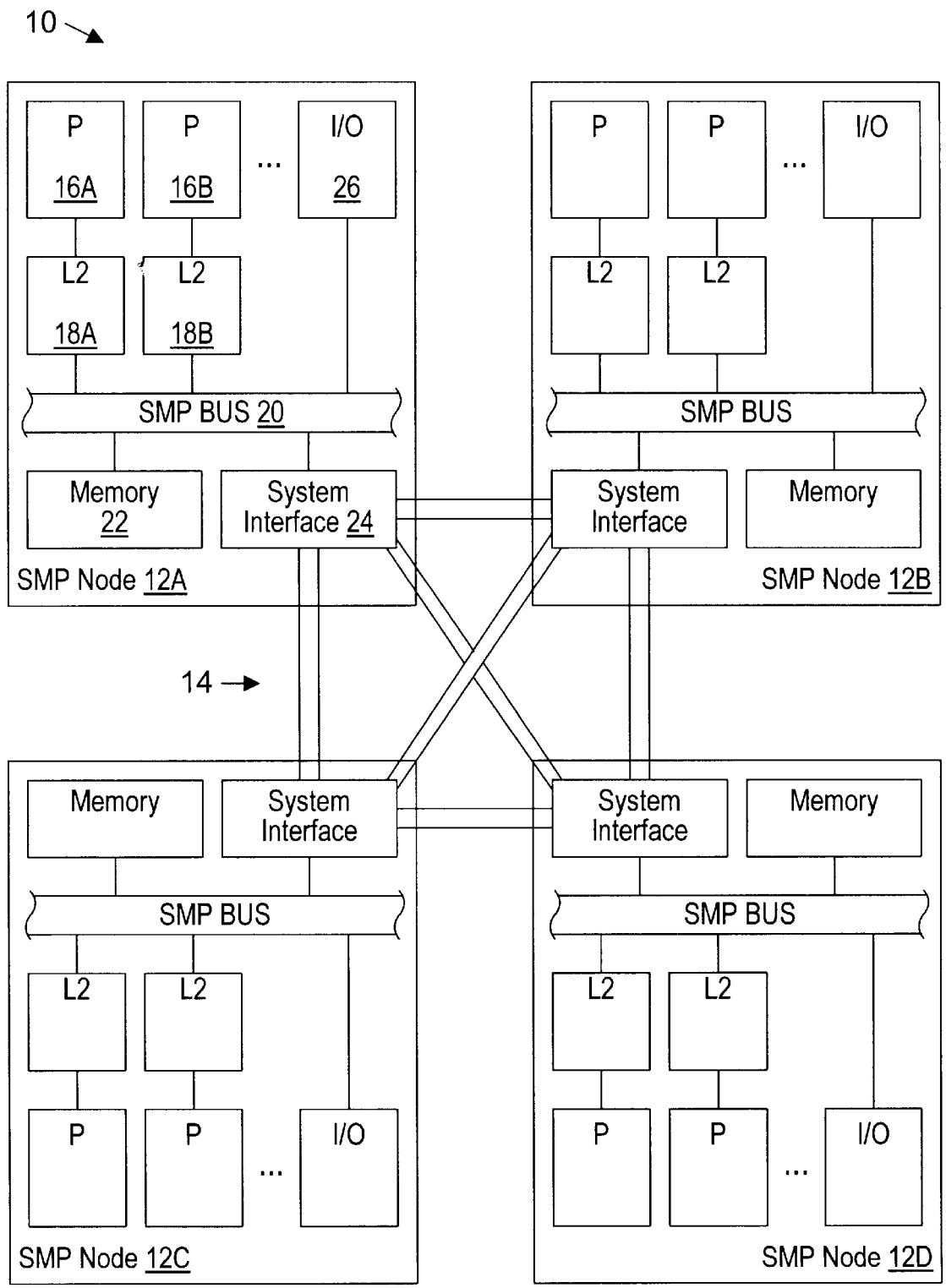
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown. Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, system interface 24 comprises one or more subnodes. One of the subnodes (the controller subnode) includes an interface to network 14, while other subnodes simply maintain storage for access rights to coherency units stored within memory 22. Upon completion of coherency activity via network 14 in response to a transaction, the controller node reissues the transaction upon SMP bus 20. Concurrently, the controller node provides an updated access rights value for storage in the subnode corresponding to the affected coherency unit. Because the updated access rights value is provided concurrent with the reissued transaction, the updated access rights are available to subsequent transactions through the corresponding subnode. Advantageously, the access rights are logically updated at the same time as the transaction completes, in accordance with the memory coherency model supported by computer system 10. The update is performed even though the access rights may be stored in a subnode other than the controller subnode. It is noted that the controller subnode may include a portion of the access rights memory (referred to herein as the MTAG) as well.

In one embodiment, each subnode which forms a portion of system interface 24 comprises a printed circuit board which is independently inserted into a backplane comprising SMP bus 20. The number of subnodes included is configurable, and therefore is expandable if the size of memory 22 is expanded. Advantageously, the amount of MTAG memory is adjustable to match the amount needed for the size of memory 22. For example, if each coherency unit is 64 bytes and access rights comprise two bits per coherency unit, then the amount of MTAG memory is $1/256^{th}$ of the size of memory 22. Computer system 10 may initially be manufactured with a particular amount of memory, and subsequently memory may be added or deleted by adding or deleting memory modules from memory 22 and adding or deleting subnodes from system interface 24.

Generally speaking, a memory operation is an operation causing transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1, a memory operation may include one or more transactions upon SMP bus 20 as well as one or more coherency operations upon network 14.

Architectural Overview

Each SMP node 12 is essentially an SMP system having memory 22 as the shared memory. Processors 16 are high performance processors. In one embodiment, each processor 16 is a SPARC processor compliant with version 9 of the SPARC processor architecture. It is noted, however, that any processor architecture may be employed by processors 16.

Typically, processors 16 include internal instruction and data caches. Therefore, external caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. Because the address and data buses are separate, a split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. Memory 22, in conjunction with similar illustrated memories in the other SMP nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node.

It is noted that, although four SMP nodes 12 are shown in FIG. 1, embodiments of computer system 10 employing any number of nodes are contemplated.

Figure 1A:
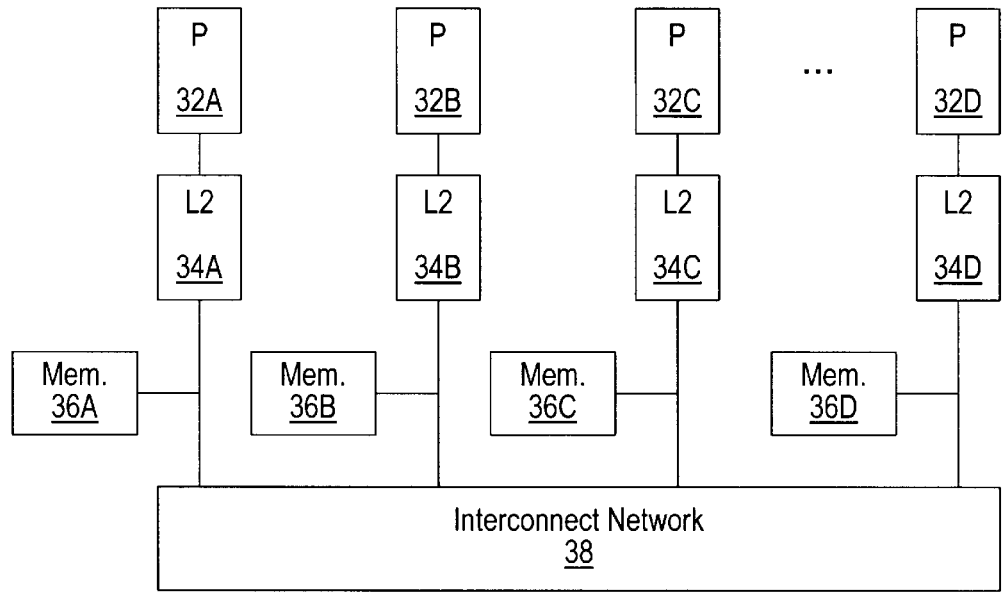
FIG. 1A is a conceptualized block diagram depicting a non-uniform memory architecture supported by one embodiment of the computer system shown in FIG. 1.
Figure 1B:
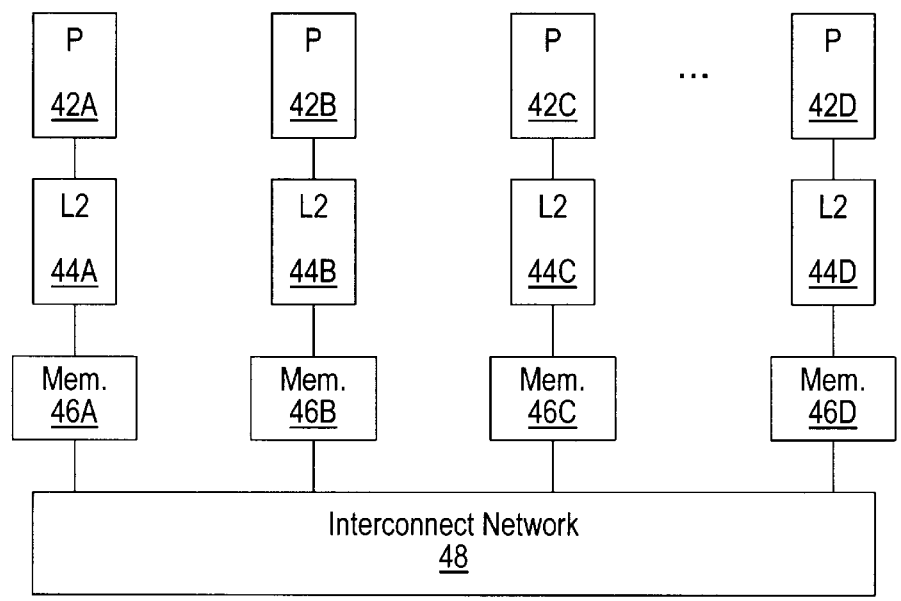
FIG. 1B is a conceptualized block diagram depicting a cache-only memory architecture supported by one embodiment of the computer system shown in FIG. 1.

FIGS. 1A and 1B are conceptualized illustrations of distributed memory architectures supported by one embodiment of computer system 10. Specifically, FIGS. 1A and 1B illustrate alternative ways in which each SMP node 12 of FIG. 1 may cache data and perform memory accesses. Details regarding the manner in which computer system 10 supports such accesses will be described in further detail below.

Turning now to FIG. 1A, a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory. For example, a local access might be completed in a few hundred nanoseconds while an access via the network might occupy a few microseconds.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Turning now to FIG. 1B, a logic diagram depicting a second memory architecture 40 supported by the computer system 10 of FIG. 1 is shown. Architecture 40 includes multiple processors 42A–42D, multiple caches 44A–44D, multiple memories 46A–46D, and network 48. However, memories 46 are logically coupled between caches 44 and network 48. Memories 46 serve as larger caches (e.g. a level 3 cache), storing addresses which are accessed by the corresponding processors 42. Memories 46 are said to "attract" the data being operated upon by a corresponding processor 42. As opposed to the NUMA architecture shown in FIG. 1A, architecture 40 reduces the number of accesses upon the network 48 by storing remote data in the local memory when the local processor accesses that data.

Architecture 40 is referred to as a cache-only memory architecture (COMA). Multiple locations within the distributed shared memory formed by the combination of memories 46 may store data corresponding to a particular address. No permanent mapping of a particular address to a particular storage location is assigned. Instead, the location storing data corresponding to the particular address changes dynamically based upon the processors 42 which access that particular address. Conversely, in the NUMA architecture a particular storage location within memories 46 is assigned to a particular address. Architecture 40 adjusts to the memory access patterns performed by applications executing thereon, and coherency is maintained between the memories 46.

In a preferred embodiment, computer system 10 supports both of the memory architectures shown in FIGS. 1A and 1B. In particular, a memory address may be accessed in a NUMA fashion from one SMP node 12A–12D while being accessed in a COMA manner from another SMP node 12A–12D. In one embodiment, a NUMA access is detected if certain bits of the address upon SMP bus 20 identify another SMP node 12 as the home node of the address presented. Otherwise, a COMA access is presumed. Additional details will be provided below.

In one embodiment, the COMA architecture is implemented using a combination of hardware and software techniques. Hardware maintains coherency between the locally cached copies of pages, and software (e.g. the operating system employed in computer system 10) is responsible for allocating and deallocating cached pages.

Figure 2:
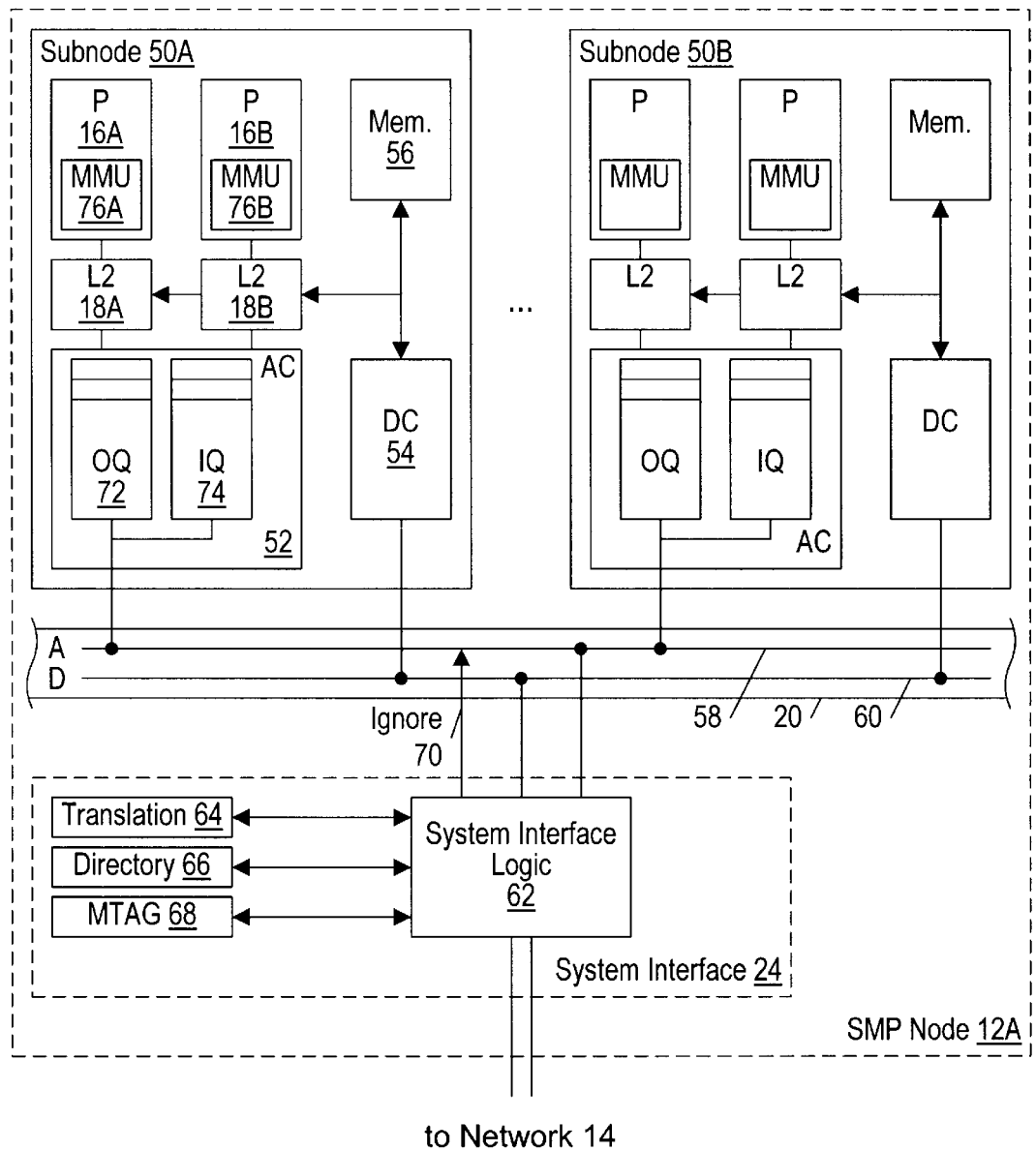
FIG. 2 is a block diagram of one embodiment of a symmetric multiprocessing node depicted in FIG. 1.

FIG. 2 depicts details of one implementation of an SMP node 12A that generally conforms to the SMP node 12A shown in FIG. 1. Other nodes 12 may be configured similarly. It is noted that alternative specific implementations of each SMP node 12 of FIG. 1 are also possible. The implementation of SMP node 12A shown in FIG. 2 includes multiple subnodes such as subnodes 50A and 50B. Each subnode 50 includes two processors 16 and corresponding caches 18, a memory portion 56, an address controller 52, and a data controller 54. The memory portions 56 within subnodes 50 collectively form the memory 22 of the SMP node 12A of FIG. 1. Other subnodes (not shown) are further coupled to SMP bus 20 to form the I/O interfaces 26.

As shown in FIG. 2, SMP bus 20 includes an address bus 58 and a data bus 60. Address controller 52 is coupled to address bus 58, and data controller 54 is coupled to data bus 60. FIG. 2 also illustrates system interface 24, including a system interface logic block 62, a translation storage 64, a directory 66, and a memory tag (MTAG) 68. Logic block 62 is coupled to both address bus 58 and data bus 60, and asserts an ignore signal 70 upon address bus 58 under certain circumstances as will be explained further below. Additionally, logic block 62 is coupled to translation storage 64, directory 66, MTAG 68, and network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Address controller 52 provides an interface between caches 18 and the address portion of SMP bus 20. In the embodiment shown, address controller 52 includes an out queue 72 and some number of in queues 74. Out queue 72 buffers transactions from the processors connected thereto until address controller 52 is granted access to address bus 58. Address controller 52 performs the transactions stored in out queue 72 in the order those transactions were placed into out queue 72 (i.e. out queue 72 is a FIFO queue). Transactions performed by address controller 52 as well as transactions received from address bus 58 which are to be snooped by caches 18 and caches internal to processors 16 are placed into in queue 74.

Similar to out queue 72, in queue 74 is a FIFO queue. All address transactions are stored in the in queue 74 of each subnode 50 (even within the in queue 74 of the subnode 50 which initiates the address transaction). Address transactions are thus presented to caches 18 and processors 16 for snooping in the order they occur upon address bus 58. The order that transactions occur upon address bus 58 is the order for SMP node 12A. However, the complete system is expected to have one global memory order. This ordering expectation creates a problem in both the NUMA and COMA architectures employed by computer system 10, since the global order may need to be established by the order of operations upon network 14. If two nodes perform a transaction to an address, the order that the corresponding coherency operations occur at the home node for the address defines the order of the two transactions as seen within each node. For example, if two write transactions are performed to the same address, then the second write operation to arrive at the address' home node should be the second write transaction to complete (i.e. a byte location which is updated by both write transactions stores a value provided by the second write transaction upon completion of both transactions). However, the node which performs the second transaction may actually have the second transaction occur first upon SMP bus 20. Ignore signal 70 allows the second transaction to be transferred to system interface 24 without the remainder of the SMP node 12 reacting to the transaction.

Therefore, in order to operate effectively with the ordering constraints imposed by the out queue/in queue structure of address controller 52, system interface logic block 62 employs ignore signal 70. When a transaction is presented upon address bus 58 and system interface logic block 62 detects that a remote transaction is to be performed in response to the transaction, logic block 62 asserts the ignore signal 70. Assertion of the ignore signal 70 with respect to a transaction causes address controller 52 to inhibit storage of the transaction into in queues 74. Therefore, other transactions which may occur subsequent to the ignored transaction and which complete locally within SMP node 12A may complete out of order with respect to the ignored transaction without violating the ordering rules of in queue 74. In particular, transactions performed by system interface 24 in response to coherency activity upon network 14 may be performed and completed subsequent to the ignored transaction. When a response is received from the remote transaction, the ignored transaction may be reissued by system interface logic block 62 upon address bus 58. The transaction is thereby placed into in queue 74, and may complete in order with transactions occurring at the time of reissue.

It is noted that in one embodiment, once a transaction from a particular address controller 52 has been ignored, subsequent coherent transactions from that particular address controller 52 are also ignored. Transactions from a particular processor 16 may have an important ordering relationship with respect to each other, independent of the ordering requirements imposed by presentation upon address bus 58. For example, a transaction may be separated from another transaction by a memory synchronizing instruction such as the MEMBAR instruction included in the SPARC architecture. The processor 16 conveys the transactions in the order the transactions are to be performed with respect to each other. The transactions are ordered within out queue 72, and therefore the transactions originating from a particular out queue 72 are to be performed in order. Ignoring subsequent transactions from a particular address controller 52 allows the in-order rules for a particular out queue 72 to be preserved. It is further noted that not all transactions from a particular processor must be ordered. However, it is difficult to determine upon address bus 58 which transactions must be ordered and which transactions may not be ordered. Therefore, in this implementation, logic block 62 maintains the order of all transactions from a particular out queue 72. It is noted that other implementations of subnode 50 are possible that allow exceptions to this rule.

Data controller 54 routes data to and from data bus 60, memory portion 56 and caches 18. Data controller 54 may include in and out queues similar to address controller 52. In one embodiment, data controller 54 employs multiple physical units in a byte-sliced bus configuration.

Processors 16 as shown in FIG. 2 include memory management units (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

Referring back to the computer system 10 shown in FIG. 1 in conjunction with the SMP node 12A implementation illustrated in FIG. 2, the physical address computed by MMUs 76 is a local physical address (LPA) defining a location within the memory 22 associated with the SMP node 12 in which the processor 16 is located. MTAG 68 stores a coherency state for each "coherency unit" in memory 22. When an address transaction is performed upon SMP bus 20, system interface logic block 62 examines the coherency state stored in MTAG 68 for the accessed coherency unit. If the coherency state indicates that the SMP node 12 has sufficient access rights to the coherency unit to perform the access, then the address transaction proceeds. If, however, the coherency state indicates that coherency activity should be performed prior to completion of the transaction, then system interface logic block 62 asserts the ignore signal 70. Logic block 62 performs coherency operations upon network 14 to acquire the appropriate coherency state. When the appropriate coherency state is acquired, logic block 62 reissues the ignored transaction upon SMP bus 20. Subsequently, the transaction completes.

Generally speaking, the coherency state maintained for a coherency unit at a particular storage location (e.g. a cache or a memory 22) indicates the access rights to the coherency unit at that SMP node 12. The access right indicates the validity of the coherency unit, as well as the read/write permission granted for the copy of the coherency unit within that SMP node 12. In one embodiment, the coherency states employed by computer system 10 are modified, owned, shared, and invalid. The modified state indicates that the SMP node 12 has updated the corresponding coherency unit. Therefore, other SMP nodes 12 do not have a copy of the coherency unit. Additionally, when the modified coherency unit is discarded by the SMP node 12, the coherency unit is stored back to the home node. The owned state indicates that the SMP node 12 is responsible for the coherency unit, but other SMP nodes 12 may have shared copies. Again, when the coherency unit is discarded by the SMP node 12, the coherency unit is stored back to the home node. The shared state indicates that the SMP node 12 may read the coherency unit but may not update the coherency unit without acquiring the owned state. Additionally, other SMP nodes 12 may have copies of the coherency unit as well. Finally, the invalid state indicates that the SMP node 12 does not have a copy of the coherency unit. In one embodiment, the modified state indicates write permission and any state but invalid indicates read permission to the corresponding coherency unit.

As used herein, a coherency unit is a number of contiguous bytes of memory which are treated as a unit for coherency purposes. For example, if one byte within the coherency unit is updated, the entire coherency unit is considered to be updated. In one specific embodiment, the coherency unit is a cache line, comprising 64 contiguous bytes. It is understood, however, that a coherency unit may comprise any number of bytes.

System interface 24 also includes a translation mechanism which utilizes translation storage 64 to store translations from the local physical address to a global address (GA). Certain bits within the global address identify the home node for the address, at which coherency information is stored for that global address. For example, an embodiment of computer system 10 may employ four SMP nodes 12 such as that of FIG. 1. In such an embodiment, two bits of the global address identify the home node. Preferably, bits from the most significant portion of the global address are used to identify the home node. The same bits are used in the local physical address to identify NUMA accesses. If the bits of the LPA indicate that the local node is not the home node, then the LPA is a global address and the transaction is performed in NUMA mode. Therefore, the operating system places global addresses in MMUs 76 for any NUMA-type pages. Conversely, the operating system places LPAs in MMU 76 for any COMA-type pages. It is noted that an LPA may equal a GA (for NUMA accesses as well as for global addresses whose home is within the memory 22 in the node in which the LPA is presented). Alternatively, an LPA may be translated to a GA when the LPA identifies storage locations used for storing copies of data having a home in another SMP node 12.

The directory 66 of a particular home node identifies which SMP nodes 12 have copies of data corresponding to a given global address assigned to the home node such that coherency between the copies may be maintained. Additionally, the directory 66 of the home node identifies the SMP node 12 which owns the coherency unit. Therefore, while local coherency between caches 18 and processors 16 is maintained via snooping, system-wide (or global) coherency is maintained using MTAG 68 and directory 66. Directory 66 stores the coherency information corresponding to the coherency units which are assigned to SMP node 12A (i.e. for which SMP node 12A is the home node).

It is noted that for the embodiment of FIG. 2, directory 66 and MTAG 68 store information for each coherency unit (i.e., on a coherency unit basis). Conversely, translation storage 64 stores local physical to global address translations defined for pages. A page includes multiple coherency units, and is typically several kilobytes or even megabytes in size.

Software accordingly creates local physical address to global address translations on a page basis (thereby allocating a local memory page for storing a copy of a remotely stored global page). Therefore, blocks of memory 22 are allocated to a particular global address on a page basis as well. However, as stated above, coherency states and coherency activities are performed upon a coherency unit. Therefore, when a page is allocated in memory to a particular global address, the data corresponding to the page is not necessarily transferred to the allocated memory. Instead, as processors 16 access various coherency units within the page, those coherency units are transferred from the owner of the coherency unit. In this manner, the data actually accessed by SMP node 12A is transferred into the corresponding memory 22. Data not accessed by SMP node 12A may not be transferred, thereby reducing overall bandwidth usage upon network 14 in comparison to embodiments which transfer the page of data upon allocation of the page in memory 22.

It is noted that in one embodiment, translation storage 64, directory 66, and/or MTAG 68 may be caches which store only a portion of the associated translation, directory, and MTAG information, respectively. The entirety of the translation, directory, and MTAG information is stored in tables within memory 22 or a dedicated memory storage (not shown). If required information for an access is not found in the corresponding cache, the tables are accessed by system interface 24.

Figure 2A:
FIG. 2A is an exemplary directory entry stored in one embodiment of a directory depicted in FIG. 2.

Turning now to FIG. 2A, an exemplary directory entry 71 is shown. Directory entry 71 may be employed by one embodiment of directory 66 shown in FIG. 2. Other embodiments of directory 66 may employ dissimilar directory entries. Directory entry 71 includes a valid bit 73, a write back bit 75, an owner field 77, and a sharers field 79. Directory entry 71 resides within the table of directory entries, and is located within the table via the global address identifying the corresponding coherency unit. More particularly, the directory entry 71 associated with a coherency unit is stored within the table of directory entries at an offset formed from the global address which identifies the coherency unit.

Valid bit 73 indicates, when set, that directory entry 71 is valid (i.e. that directory entry 71 is storing coherency information for a corresponding coherency unit). When clear, valid bit 73 indicates that directory entry 71 is invalid.

Owner field 77 identifies one of SMP nodes 12 as the owner of the coherency unit. The owning SMP node 12A–12D maintains the coherency unit in either the modified or owned states. Typically, the owning SMP node 12A–12D acquires the coherency unit in the modified state (see FIG. 13 below). Subsequently, the owning SMP node 12A–12D may then transition to the owned state upon providing a copy of the coherency unit to another SMP node 12A–12D. The other SMP node 12A–12D acquires the coherency unit in the shared state. In one embodiment, owner field 77 comprises two bits encoded to identify one of four SMP nodes 12A–12D as the owner of the coherency unit.

Sharers field 79 includes one bit assigned to each SMP node 12A–12D. If an SMP node 12A–12D is maintaining a shared copy of the coherency unit, the corresponding bit within sharers field 79 is set. Conversely, if the SMP node 12A–12D is not maintaining a shared copy of the coherency unit, the corresponding bit within sharers field 79 is clear. In this manner, sharers field 79 indicates all of the shared copies of the coherency unit which exist within the computer system 10 of FIG. 1.

Write back bit 75 indicates, when set, that the SMP node 12A–12D identified as the owner of the coherency unit via owner field 77 has written the updated copy of the coherency unit to the home SMP node 12. When clear, bit 75 indicates that the owning SMP node 12A–12D has not written the updated copy of the coherency unit to the home SMP node 12A–12D.

Figure 3:
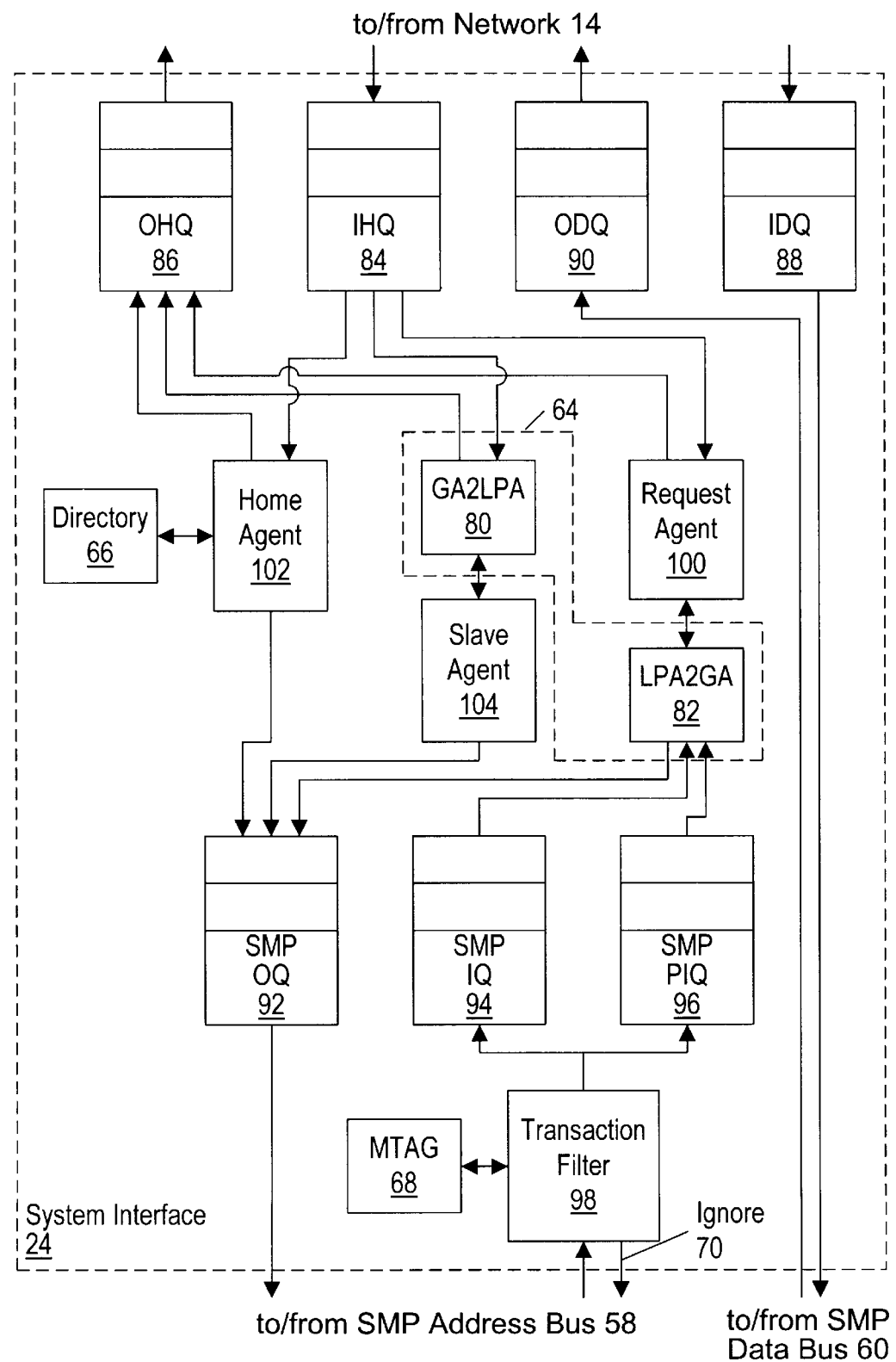
FIG. 3 is a block diagram of one embodiment of a system interface shown in FIG. 1.

Turning now to FIG. 3, a block diagram of one embodiment of system interface 24 is shown. As shown in FIG. 3, system interface 24 includes directory 66, translation storage 64, and MTAG 68. Translation storage 64 is shown as a global address to local physical address (GA2LPA) translation unit 80 and a local physical address to global address (LPA2GA) translation unit 82.

System interface 24 also includes input and output queues for storing transactions to be performed upon SMP bus 20 or network 14. Specifically, for the embodiment shown, system interface 24 includes input header queue 84 and output header queue 86 for buffering header packets to and from network 14. Header packets identify an operation to be performed, and specify the number and format of any data packets which may follow. Output header queue 86 buffers header packets to be transmitted upon network 14, and input header queue 84 buffers header packets received from network 14 until system interface 24 processes the received header packets. Similarly, data packets are buffered in input data queue 88 and output data queue 90 until the data may be transferred upon SMP data bus 60 and network 14, respectively.

SMP out queue 92, SMP in queue 94, and SMP I/O in queue (PIQ) 96 are used to buffer address transactions to and from address bus 58. SMP out queue 92 buffers transactions to be presented by system interface 24 upon address bus 58. Reissue transactions queued in response to the completion of coherency activity with respect to an ignored transaction are buffered in SMP out queue 92. Additionally, transactions generated in response to coherency activity received from network 14 are buffered in SMP out queue 92. SMP in queue 94 stores coherency related transactions to be serviced by system interface 24. Conversely, SMP PIQ 96 stores I/O transactions to be conveyed to an I/O interface residing in another SMP node 12. I/O transactions generally are considered non-coherent and therefore do not generate coherency activities.

SMP in queue 94 and SMP PIQ 96 receive transactions to be queued from a transaction filter 98. Transaction filter 98 is coupled to MTAG 68 and SMP address bus 58. If transaction filter 98 detects an I/O transaction upon address bus 58 which identifies an I/O interface upon another SMP node 12, transaction filter 98 places the transaction into SMP PIQ 96. If a coherent transaction to an LPA address is detected by transaction filter 98, then the corresponding coherency state from MTAG 68 is examined. In accordance with the coherency state, transaction filter 98 may assert ignore signal 70 and may queue a coherency transaction in SMP in queue 94. Ignore signal 70 is asserted and a coherency transaction queued if MTAG 68 indicates that insufficient access rights to the coherency unit for performing the coherent transaction is maintained by SMP node 12A. Conversely, ignore signal 70 is deasserted and a coherency transaction is not generated if MTAG 68 indicates that a sufficient access right is maintained by SMP node 12A.

Transactions from SMP in queue 94 and SMP PIQ 96 are processed by a request agent 100 within system interface 24. Prior to action by request agent 100, LPA2GA translation unit 82 translates the address of the transaction (if it is an LPA address) from the local physical address presented upon SMP address bus 58 into the corresponding global address. Request agent 100 then generates a header packet specifying a particular coherency request to be transmitted to the home node identified by the global address. The coherency request is placed into output header queue 86. Subsequently, a coherency reply is received into input header queue 84. Request agent 100 processes the coherency replies from input header queue 84, potentially generating reissue transactions for SMP out queue 92 (as described below).

Also included in system interface 24 is a home agent 102 and a slave agent 104. Home agent 102 processes coherency requests received from input header queue 84. From the coherency information stored in directory 66 with respect to a particular global address, home agent 102 determines if a coherency demand is to be transmitted to one or more slave agents in other SMP nodes 12. In one embodiment, home agent 102 blocks the coherency information corresponding to the affected coherency unit. In other words, subsequent requests involving the coherency unit are not performed until the coherency activity corresponding to the coherency request is completed. According to one embodiment, home agent 102 receives a coherency completion from the request agent which initiated the coherency request (via input header queue 84). The coherency completion indicates that the coherency activity has completed. Upon receipt of the coherency completion, home agent 102 removes the block upon the coherency information corresponding to the affected coherency unit. It is noted that, since the coherency information is blocked until completion of the coherency activity, home agent 102 may update the coherency information in accordance with the coherency activity performed immediately when the coherency request is received.

Slave agent 104 receives coherency demands from home agents of other SMP nodes 12 via input header queue 84. In response to a particular coherency demand, slave agent 104 may queue a coherency transaction in SMP out queue 92. In one embodiment, the coherency transaction may cause caches 18 and caches internal to processors 16 to invalidate the affected coherency unit. If the coherency unit is modified in the caches, the modified data is transferred to system interface 24. Alternatively, the coherency transaction may cause caches 18 and caches internal to processors 16 to change the coherency state of the coherency unit to shared. Once slave agent 104 has completed activity in response to a coherency demand, slave agent 104 transmits a coherency reply to the request agent which initiated the coherency request corresponding to the coherency demand. The coherency reply is queued in output header queue 86. Prior to performing activities in response to a coherency demand, the global address received with the coherency demand is translated to a local physical address via GA2LPA translation unit 80.

According to one embodiment, the coherency protocol enforced by request agents 100, home agents 102, and slave agents 104 includes a write invalidate policy. In other words, when a processor 16 within an SMP node 12 updates a coherency unit, any copies of the coherency unit stored within other SMP nodes 12 are invalidated. However, other write policies may be used in other embodiments. For example, a write update policy may be employed. According to a write update policy, when an coherency unit is updated the updated data is transmitted to each of the copies of the coherency unit stored in each of the SMP nodes 12.

Figure 4:
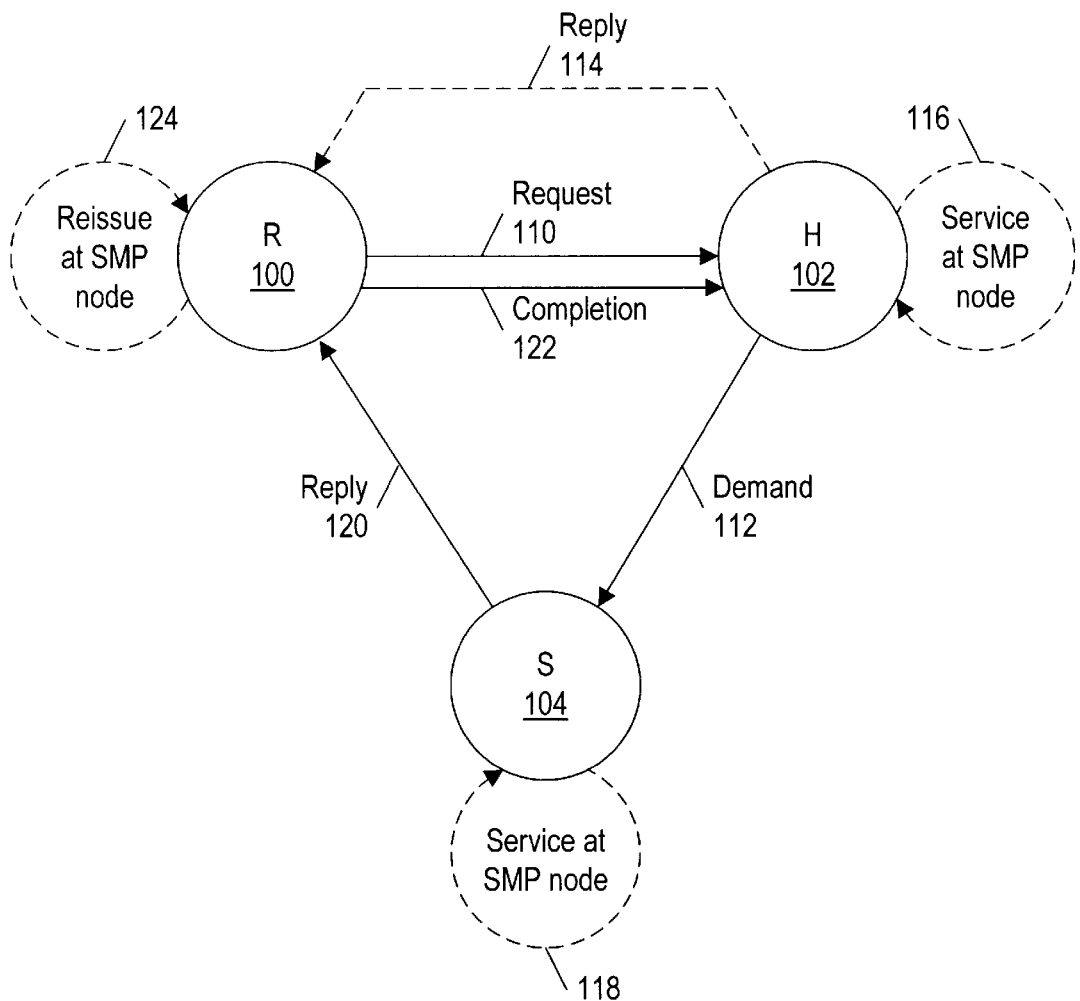
FIG. 4 is a diagram depicting activities performed in response to a typical coherency operation between a request agent, a home agent, and a slave agent.

Turning next to FIG. 4, a diagram depicting typical coherency activity performed between the request agent 100 of a first SMP node 12A–12D (the "requesting node"), the home agent 102 of a second SMP node 12A–12D (the "home node"), and the slave agent 104 of a third SMP node 12A–12D (the "slave node") in response to a particular transaction upon the SMP bus 20 within the SMP node 12 corresponding to request agent 100 is shown. Specific coherency activities employed according to one embodiment of computer system 10 as shown in FIG. 1 are further described below with respect to FIGS. 9–13. Reference numbers 100, 102, and 104 are used to identify request agents, home agents, and slave agents throughout the remainder of this description. It is understood that, when an agent communicates with another agent, the two agents often reside in different SMP nodes 12A–12D.

Upon receipt of a transaction from SMP bus 20, request agent 100 forms a coherency request appropriate for the transaction and transmits the coherency request to the home node corresponding to the address of the transaction (reference number 110). The coherency request indicates the access right requested by request agent 100, as well as the global address of the affected coherency unit. The access right requested is sufficient for allowing occurrence of the transaction being attempted in the SMP node 12 corresponding to request agent 100.

Upon receipt of the coherency request, home agent 102 accesses the associated directory 66 and determines which SMP nodes 12 are storing copies of the affected coherency unit. Additionally, home agent 102 determines the owner of the coherency unit. Home agent 102 may generate a coherency demand to the slave agents 104 of each of the nodes storing copies of the affected coherency unit, as well as to the slave agent 104 of the node which has the owned coherency state for the affected coherency unit (reference number 112). The coherency demands indicate the new coherency state for the affected coherency unit in the receiving SMP nodes 12. While the coherency request is outstanding, home agent 102 blocks the coherency information corresponding to the affected coherency unit such that subsequent coherency requests involving the affected coherency unit are not initiated by the home agent 102. Home agent 102 additionally updates the coherency information to reflect completion of the coherency request.

Home agent 102 may additionally transmit a coherency reply to request agent 100 (reference number 114). The coherency reply may indicate the number of coherency replies which are forthcoming from slave agents 104. Alternatively, certain transactions may be completed without interaction with slave agents 104. For example, an I/O transaction targeting an I/O interface 26 in the SMP node 12 containing home agent 102 may be completed by home agent 102. Home agent 102 may queue a transaction for the associated SMP bus 20 (reference number 116), and then transmit a reply indicating that the transaction is complete.

A slave agent 104, in response to a coherency demand from home agent 102, may queue a transaction for presentation upon the associated SMP bus 20 (reference number 118). Additionally, slave agents 104 transmit a coherency reply to request agent 100 (reference number 120). The coherency reply indicates that the coherency demand received in response to a particular coherency request has been completed by that slave. The coherency reply is transmitted by slave agents 104 when the coherency demand has been completed, or at such time prior to completion of the coherency demand at which the coherency demand is guaranteed to be completed upon the corresponding SMP node 12 and at which no state changes to the affected coherency unit will be performed prior to completion of the coherency demand.

When request agent 100 has received a coherency reply from each of the affected slave agents 104, request agent 100 transmits a coherency completion to home agent 102 (reference number 122). Upon receipt of the coherency completion, home agent 102 removes the block from the corresponding coherency information. Request agent 100 may queue a reissue transaction for performance upon SMP bus 20 to complete the transaction within the SMP node 12 (reference number 124).

It is noted that each coherency request is assigned a unique tag by the request agent 100 which issues the coherency request. Subsequent coherency demands, coherency replies, and coherency completions include the tag. In this manner, coherency activity regarding a particular coherency request may be identified by each of the involved agents. It is further noted that non-coherent operations may be performed in response to non-coherent transactions (e.g. I/O transactions). Non-coherent operations may involve only the requesting node and the home node. Still further, a different unique tag may be assigned to each coherency request by the home agent 102. The different tag identifies the home agent 102, and is used for the coherency completion in lieu of the requestor tag.

Figure 5:
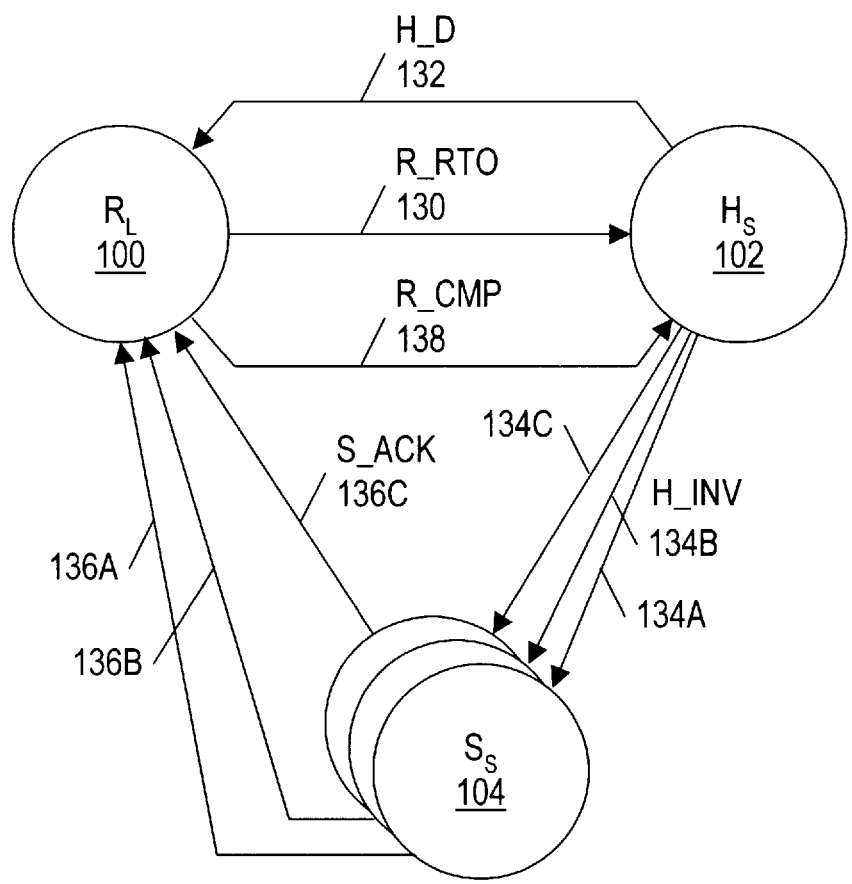
FIG. 5 is an exemplary coherency operation performed in response to a read to own request from a processor.

Turning now to FIG. 5, a diagram depicting coherency activity for an exemplary embodiment of computer system 10 in response to a read to own transaction upon SMP bus 20 is shown. A read to own transaction is performed when a cache miss is detected for a particular datum requested by a processor 16 and the processor 16 requests write permission to the coherency unit. A store cache miss may generate a read to own transaction, for example.

A request agent 100, home agent 102, and several slave agents 104 are shown in FIG. 5. The node receiving the read to own transaction from SMP bus 20 stores the affected coherency unit in the invalid state (e.g. the coherency unit is not stored in the node). The subscript "i" in request node 100 indicates the invalid state. The home node stores the coherency unit in the shared state, and nodes corresponding to several slave agents 104 store the coherency unit in the shared state as well. The subscript "s" in home agent 102 and slave agents 104 is indicative of the shared state at those nodes. The read to own operation causes transfer of the requested coherency unit to the requesting node. The requesting node receives the coherency unit in the modified state.

Upon receipt of the read to own transaction from SMP bus 20, request agent 100 transmits a read to own coherency request to the home node of the coherency unit (reference number 130). The home agent 102 in the receiving home node detects the shared state for one or more other nodes. Since the slave agents are each in the shared state, not the owned state, the home node may supply the requested data directly. Home agent 102 transmits a data coherency reply to request agent 100, including the data corresponding to the requested coherency unit (reference number 132). Additionally, the data coherency reply indicates the number of acknowledgments which are to be received from slave agents of other nodes prior to request agent 100 taking ownership of the data. Home agent 102 updates directory 66 to indicate that the requesting SMP node 12A–12D is the owner of the coherency unit, and that each of the other SMP nodes 12A–12D is invalid. When the coherency information regarding the coherency unit is unblocked upon receipt of a coherency completion from request agent 100, directory 66 matches the state of the coherency unit at each SMP node 12.

Home agent 102 transmits invalidate coherency demands to each of the slave agents 104 which are maintaining shared copies of the affected coherency unit (reference numbers 134A, 134B, and 134C). The invalidate coherency demand causes the receiving slave agent to invalidate the corresponding coherency unit within the node, and to send an acknowledge coherency reply to the requesting node indicating completion of the invalidation. Each slave agent 104 completes invalidation of the coherency unit and subsequently transmits an acknowledge coherency reply (reference numbers 136A, 136B, and 136C). In one embodiment, each of the acknowledge replies includes a count of the total number of replies to be received by request agent 100 with respect to the coherency unit.

Subsequent to receiving each of the acknowledge coherency replies from slave agents 104 and the data coherency reply from home agent 102, request agent 100 transmits a coherency completion to home agent 102 (reference number 138). Request agent 100 validates the coherency unit within its local memory, and home agent 102 releases the block upon the corresponding coherency information. It is noted that data coherency reply 132 and acknowledge coherency replies 136 may be received in any order depending upon the number of outstanding transactions within each node, among other things.

Figure 6:
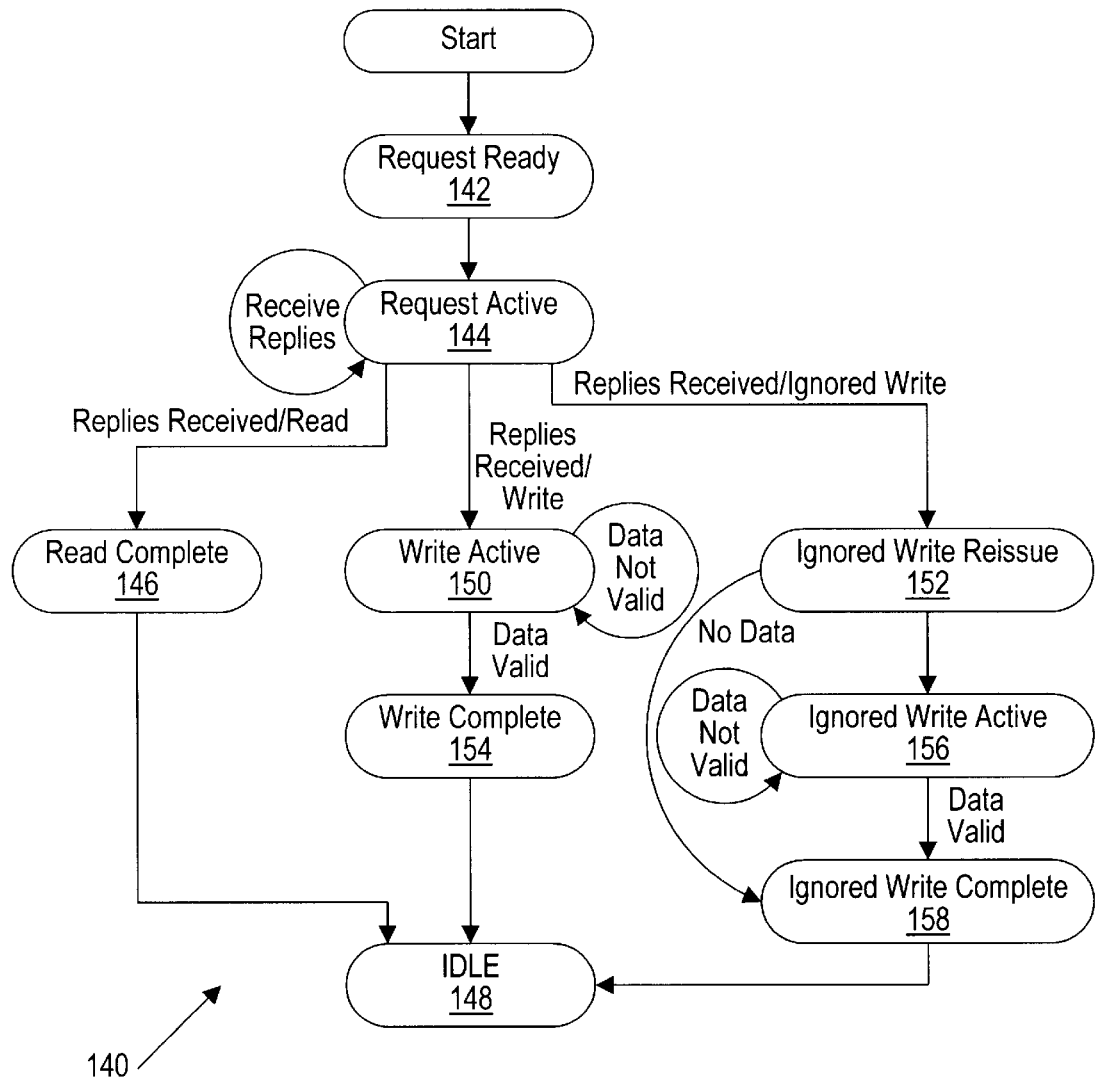
FIG. 6 is a flowchart depicting an exemplary state machine for one embodiment of a request agent shown in FIG. 3.

Turning now to FIG. 6, a flowchart 140 depicting an exemplary state machine for use by request agents 100 is shown. Request agents 100 may include multiple independent copies of the state machine represented by flowchart 140, such that multiple requests may be concurrently processed.

Upon receipt of a transaction from SMP in queue 94, request agent 100 enters a request ready state 142. In request ready state 142, request agent 100 transmits a coherency request to the home agent 102 residing in the home node identified by the global address of the affected coherency unit. Upon transmission of the coherency request, request agent 100 transitions to a request active state 144. During request active state 144, request agent 100 receives coherency replies from slave agents 104 (and optionally from home agent 102). When each of the coherency replies has been received, request agent 100 transitions to a new state depending upon the type of transaction which initiated the coherency activity. Additionally, request active state 142 may employ a timer for detecting that coherency replies have not be received within a predefined time-out period. If the timer expires prior to the receipt of the number of replies specified by home agent 102, then request agent 100 transitions to an error state (not shown). Still further, certain embodiments may employ a reply indicating that a read transfer failed. If such a reply is received, request agent 100 transitions to request ready state 142 to reattempt the read.

If replies are received without error or time-out, then the state transitioned to by request agent 100 for read transactions is read complete state 146. It is noted that, for read transactions, one of the received replies may include the data corresponding to the requested coherency unit. Request agent 100 reissues the read transaction upon SMP bus 20 and further transmits the coherency completion to home agent 102. Subsequently, request agent 100 transitions to an idle state 148. A new transaction may then be serviced by request agent 100 using the state machine depicted in FIG. 6.

Conversely, write active state 150 and ignored write reissue state 152 are used for write transactions. Ignore signal 70 is not asserted for certain write transactions in computer system 10, even when coherency activity is initiated upon network 14. For example, I/O write transactions are not ignored. The write data is transferred to system interface 24, and is stored therein. Write active state 150 is employed for non-ignored write transactions, to allow for transfer of data to system interface 24 if the coherency replies are received prior to the data phase of the write transaction upon SMP bus 20. Once the corresponding data has been received, request agent 100 transitions to write complete state 154. During write complete state 154, the coherency completion reply is transmitted to home agent 102. Subsequently, request agent 100 transitions to idle state 148.

Ignored write transactions are handled via a transition to ignored write reissue state 152. During ignored write reissue state 152, request agent 100 reissues the ignored write transaction upon SMP bus 20. In this manner, the write data may be transferred from the originating processor 16 and the corresponding write transaction released by processor 16. Depending upon whether or not the write data is to be transmitted with the coherency completion, request agent 100 transitions to either the ignored write active state 156 or the ignored write complete state 158. Ignored write active state 156, similar to write active state 150, is used to await data transfer from SMP bus 20. During ignored write complete state 158, the coherency completion is transmitted to home agent 102. Subsequently, request agent 100 transitions to idle state 148. From idle state 148, request agent 100 transitions to request ready state 142 upon receipt of a transaction from SMP in queue 94.

Figure 7:
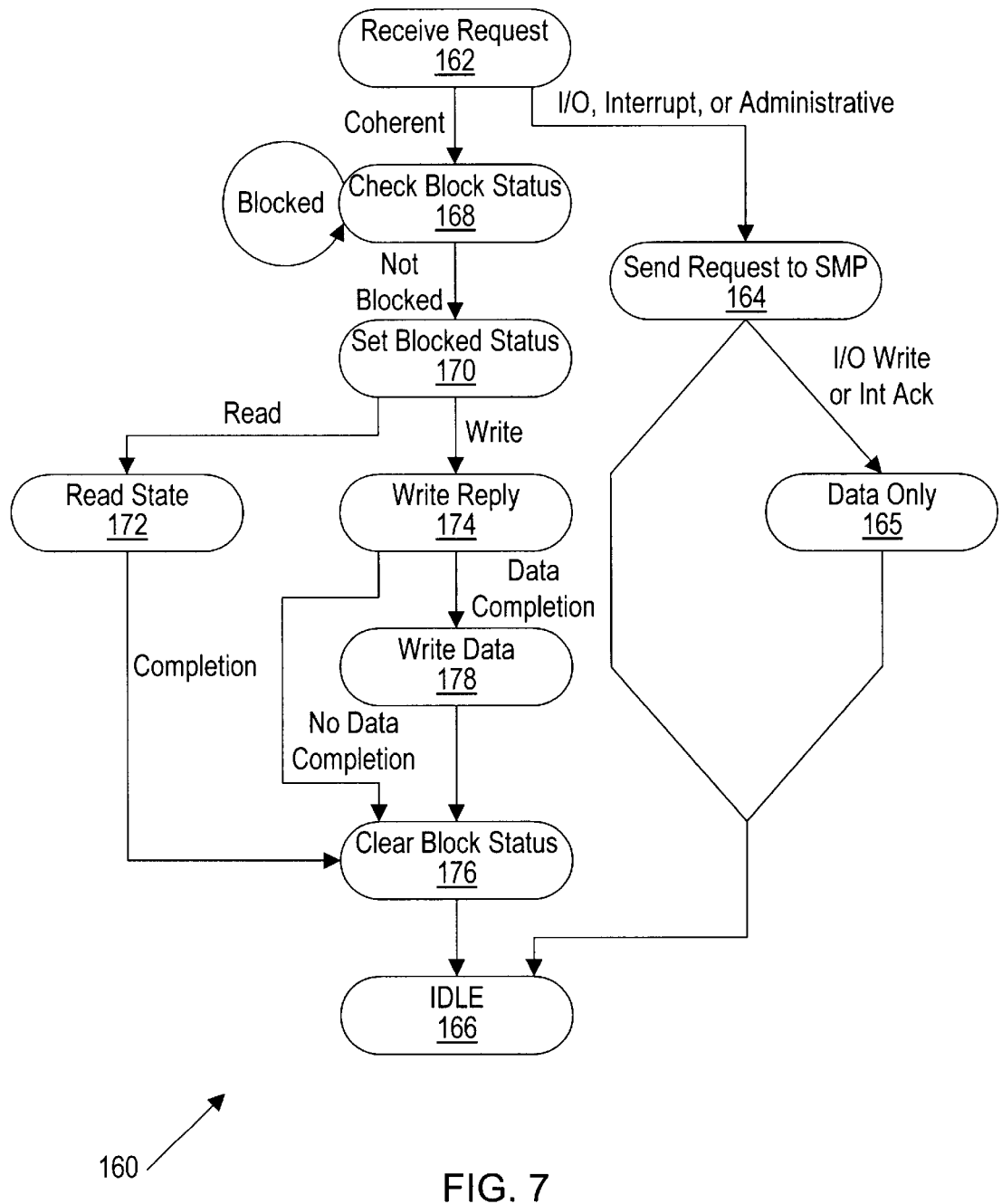
FIG. 7 is a flowchart depicting an exemplary state machine for one embodiment of a home agent shown in FIG. 3.

Turning next to FIG. 7, a flowchart 160 depicting an exemplary state machine for home agent 102 is shown. Home agents 102 may include multiple independent copies of the state machine represented by flowchart 160 in order to allow for processing of multiple outstanding requests to the home agent 102. However, the multiple outstanding requests do not affect the same coherency unit, according to one embodiment.

Home agent 102 receives coherency requests in a receive request state 162. The request may be classified as either a coherent request or an other transaction request. Other transaction requests may include I/O read and I/O write requests, interrupt requests, and administrative requests, according to one embodiment. The non-coherent requests are handled by transmitting a transaction upon SMP bus 20, during a state 164. A coherency completion is subsequently transmitted. Upon receiving the coherency completion, I/O write and accepted interrupt transactions result in transmission of a data transaction upon SMP bus 20 in the home node (i.e. data only state 165). When the data has been transferred, home agent 102 transitions to idle state 166. Alternatively, I/O read, administrative, and rejected interrupted transactions cause a transition to idle state 166 upon receipt of the coherency completion.

Conversely, home agent 102 transitions to a check state 168 upon receipt of a coherent request. Check state 168 is used to detect if coherency activity is in progress for the coherency unit affected by the coherency request. If the coherency activity is in progress (i.e. the coherency information is blocked), then home agent 102 remains in check state 168 until the in-progress coherency activity completes. Home agent 102 subsequently transitions to a set state 170.

During set state 170, home agent 102 sets the status of the directory entry storing the coherency information corresponding to the affected coherency unit to blocked. The blocked status prevents subsequent activity to the affected coherency unit from proceeding, simplifying the coherency protocol of computer system 10. Depending upon the read or write nature of the transaction corresponding to the received coherency request, home agent 102 transitions to read state 172 or write reply state 174.

While in read state 172, home agent 102 issues coherency demands to slave agents 104 which are to be updated with respect to the read transaction. Home agent 102 remains in read state 172 until a coherency completion is received from request agent 100, after which home agent 102 transitions to clear block status state 176. In embodiments in which a coherency request for a read may fail, home agent 102 restores the state of the affected directory entry to the state prior to the coherency request upon receipt of a coherency completion indicating failure of the read transaction.

During write state 174, home agent 102 transmits a coherency reply to request agent 100. Home agent 102 remains in write reply state 174 until a coherency completion is received from request agent 100. If data is received with the coherency completion, home agent 102 transitions to write data state 178. Alternatively, home agent 102 transitions to clear block status state 176 upon receipt of a coherency completion not containing data.

Home agent 102 issues a write transaction upon SMP bus 20 during write data state 178 in order to transfer the received write data. For example, a write stream operation (described below) results in a data transfer of data to home agent 102. Home agent 102 transmits the received data to memory 22 for storage. Subsequently, home agent 102 transitions to clear blocked status state 176.

Home agent 102 clears the blocked status of the coherency information corresponding to the coherency unit affected by the received coherency request in clear block status state 176. The coherency information may be subsequently accessed. The state found within the unblocked coherency information reflects the coherency activity initiated by the previously received coherency request. After clearing the block status of the corresponding coherency information, home agent 102 transitions to idle state 166. From idle state 166, home agent 102 transitions to receive request state 162 upon receipt of a coherency request.

Figure 8:
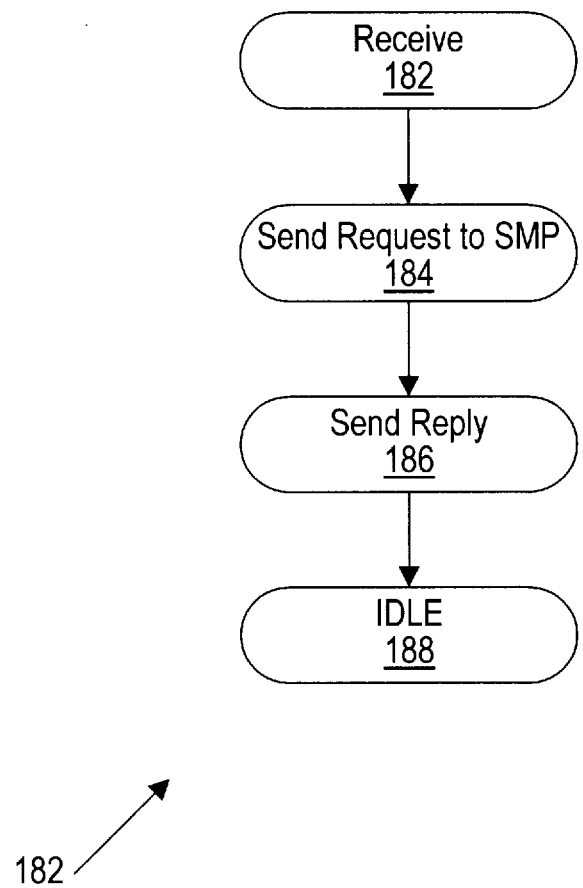
FIG. 8 is a flowchart depicting an exemplary state machine for one embodiment of a slave agent shown in FIG. 3.

Turning now to FIG. 8, a flowchart 180 is shown depicting an exemplary state machine for slave agents 104. Slave agent 104 receives coherency demands during a receive state 182. In response to a coherency demand, slave agent 104 may queue a transaction for presentation upon SMP bus 20. The transaction causes a state change in caches 18 and caches internal to processors 16 in accordance with the received coherency demand. Slave agent 104 queues the transaction during send request state 184.

During send reply state 186, slave agent 104 transmits a coherency reply to the request agent 100 which initiated the transaction. It is noted that, according to various embodiments, slave agent 104 may transition from send request state 184 to send reply state 186 upon queuing the transaction for SMP bus 20 or upon successful completion of the transaction upon SMP bus 20. Subsequent to coherency reply transmittal, slave agent 104 transitions to an idle state 188. From idle state 188, slave agent 104 may transition to receive state 182 upon receipt of a coherency demand.

Turning now to FIGS. 9–12, several tables are shown listing exemplary coherency request types, coherency demand types, coherency reply types, and coherency completion types. The types shown in the tables of FIGS. 9–12 may be employed by one embodiment of computer system 10. Other embodiments may employ other sets of types.

Figure 9:
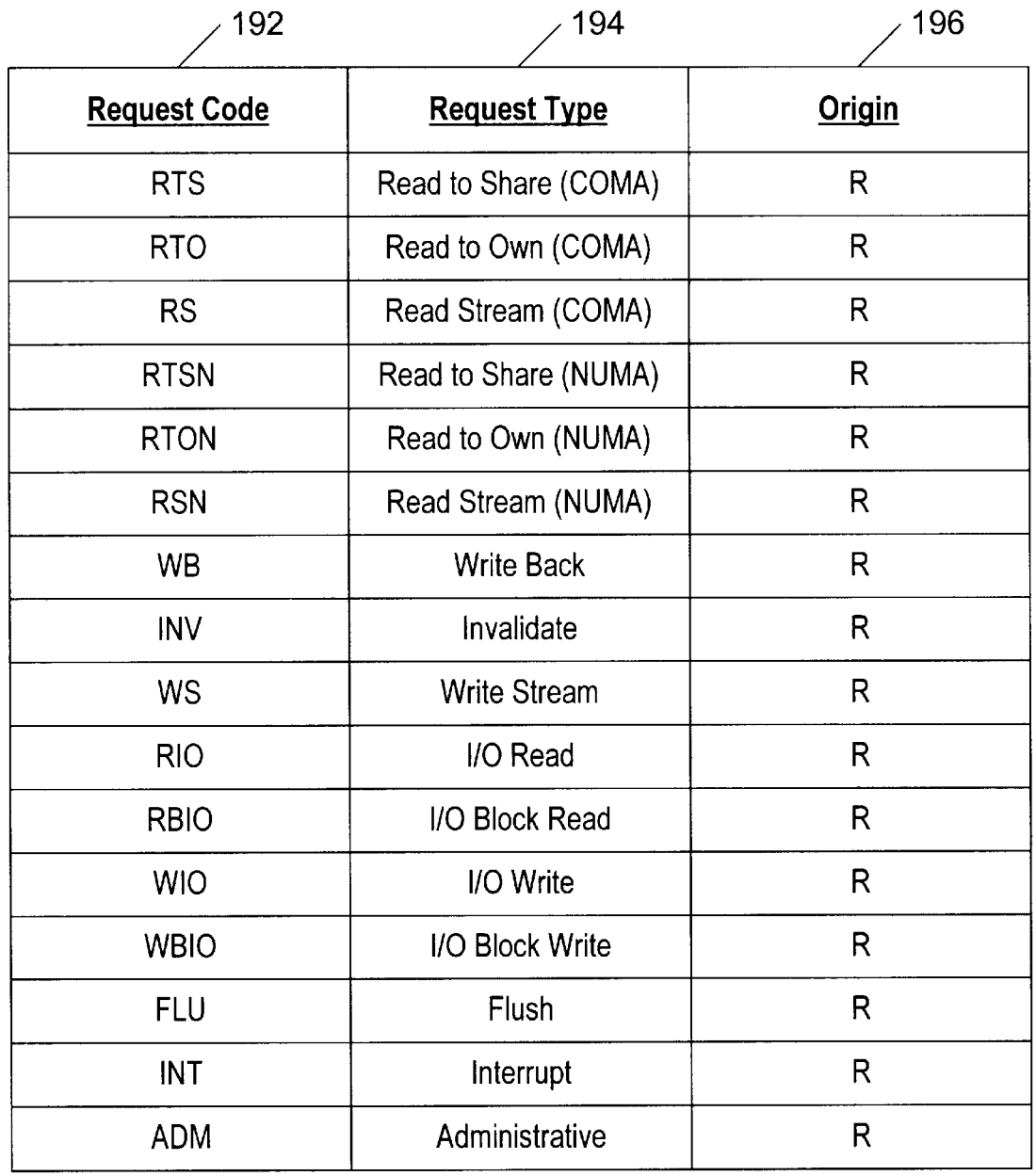
FIG. 9 is a table listing request types according to one embodiment of the system interface.

FIG. 9 is a table 190 listing the types of coherency requests. A first column 192 lists a code for each request type, which is used in FIG. 13 below. A second column 194 lists the coherency requests types, and a third column 196 indicates the originator of the coherency request. Similar columns are used in FIGS. 10–12 for coherency demands, coherency replies, and coherency completions. An "R" indicates request agent 100; an "S" indicates slave agent 104; and an "H" indicates home agent 102.

A read to share request is performed when a coherency unit is not present in a particular SMP node and the nature of the transaction from SMP bus 20 to the coherency unit indicates that read access to the coherency unit is desired. For example, a cacheable read transaction may result in a read to share request. Generally speaking, a read to share request is a request for a copy of the coherency unit in the shared state. Similarly, a read to own request is a request for a copy of the coherency unit in the owned state. Copies of the coherency unit in other SMP nodes should be changed to the invalid state. A read to own request may be performed in response to a cache miss of a cacheable write transaction, for example.

Read stream and write stream are requests to read or write an entire coherency unit. These operations are typically used for block copy operations. Processors 16 and caches 18 do not cache data provided in response to a read stream or write stream request. Instead, the coherency unit is provided as data to the processor 16 in the case of a read stream request, or the data is written to the memory 22 in the case of a write stream request. It is noted that read to share, read to own, and read stream requests may be performed as COMA operations (e.g. RTS, RTO, and RS) or as NUMA operations (e.g. RTSN, RTON, and RSN).

A write back request is performed when a coherency unit is to be written to the home node of the coherency unit. The home node replies with permission to write the coherency unit back. The coherency unit is then passed to the home node with the coherency completion.

The invalidate request is performed to cause copies of a coherency unit in other SMP nodes to be invalidated. An exemplary case in which the invalidate request is generated is a write stream transaction to a shared or owned coherency unit. The write stream transaction updates the coherency unit, and therefore copies of the coherency unit in other SMP nodes are invalidated.

I/O read and write requests are transmitted in response to I/O read and write transactions. I/O transactions are non-coherent (i.e. the transactions are not cached and coherency is not maintained for the transactions). I/O block transactions transfer a larger portion of data than normal I/O transactions. In one embodiment, sixty-four bytes of information are transferred in a block I/O operation while eight bytes are transferred in a non-block I/O transaction.

Flush requests cause copies of the coherency unit to be invalidated. Modified copies are returned to the home node. Interrupt requests are used to signal interrupts to a particular device in a remote SMP node. The interrupt may be presented to a particular processor 16, which may execute an interrupt service routine stored at a predefined address in response to the interrupt. Administrative packets are used to send certain types of reset signals between the nodes.

FIG. 10 is a table 198 listing exemplary coherency demand types. Similar to table 190, columns 192, 194, and 196 are included in table 198. A read to share demand is conveyed to the owner of a coherency unit, causing the owner to transmit data to the requesting node. Similarly, read to own and read stream demands cause the owner of the coherency unit to transmit data to the requesting node. Additionally, a read to own demand causes the owner to change the state of the coherency unit in the owner node to invalid. Read stream and read to share demands cause a state change to owned (from modified) in the owner node.

Invalidate demands do not cause the transfer of the corresponding coherency unit. Instead, an invalidate demand causes copies of the coherency unit to be invalidated. Finally, administrative demands are conveyed in response to administrative requests. It is noted that each of the demands are initiated by home agent 102, in response to a request from request agent 100.

Figure 11:
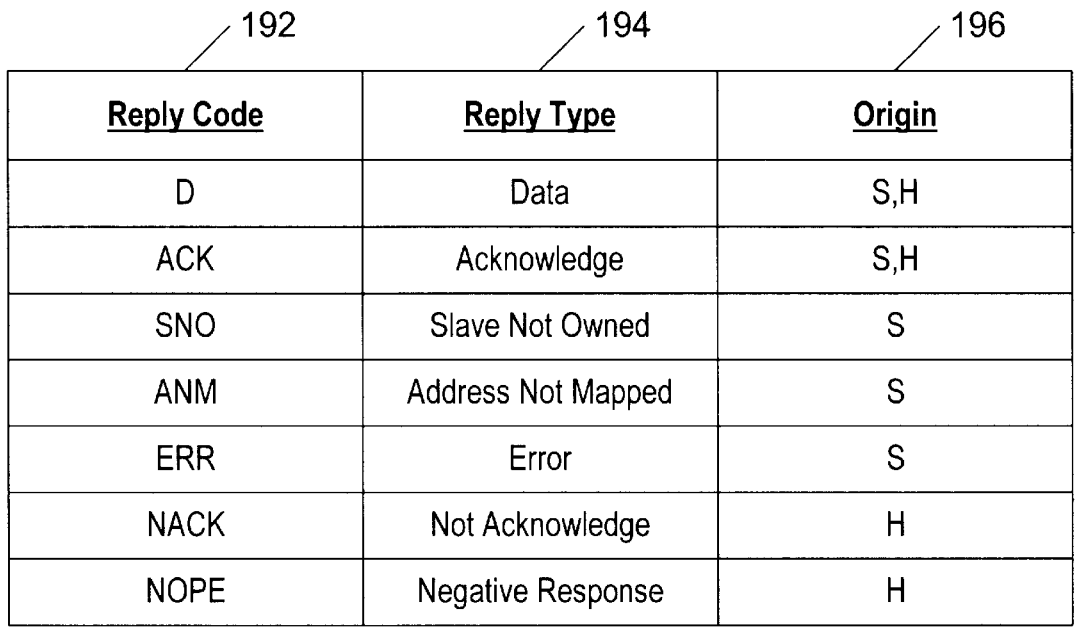
FIG. 11 is a table listing reply types according to one embodiment of the system interface.

FIG. 11 is a table 200 listing exemplary reply types employed by one embodiment of computer system 10. Similar to FIGS. 9 and 10, FIG. 11 includes columns 192, 194, and 196 for the coherency replies.

A data reply is a reply including the requested data. The owner slave agent typically provides the data reply for coherency requests. However, home agents may provide data for I/O read requests.

The acknowledge reply indicates that a coherency demand associated with a particular coherency request is completed. Slave agents typically provide acknowledge replies, but home agents provide acknowledge replies (along with data) when the home node is the owner of the coherency unit.

Slave not owned, address not mapped and error replies are conveyed by slave agent 104 when an error is detected. The slave not owned reply is sent if a slave is identified by home agent 102 as the owner of a coherency unit and the slave no longer owns the coherency unit. The address not mapped reply is sent if the slave receives a demand for which no device upon the corresponding SMP bus 20 claims ownership. Other error conditions detected by the slave agent are indicated via the error reply.

In addition to the error replies available to slave agent 104, home agent 102 may provide error replies. The negative acknowledge (NACK) and negative response (NOPE) are used by home agent 102 to indicate that the corresponding request is does not require service by home agent 102. The NACK transaction may be used to indicate that the corresponding request is rejected by the home node. For example, an interrupt request receives a NACK if the interrupt is rejected by the receiving node. An acknowledge (ACK) is conveyed if the interrupt is accepted by the receiving node. The NOPE transaction is used to indicate that a corresponding flush request was conveyed for a coherency unit which is not stored by the requesting node.

Figure 12:
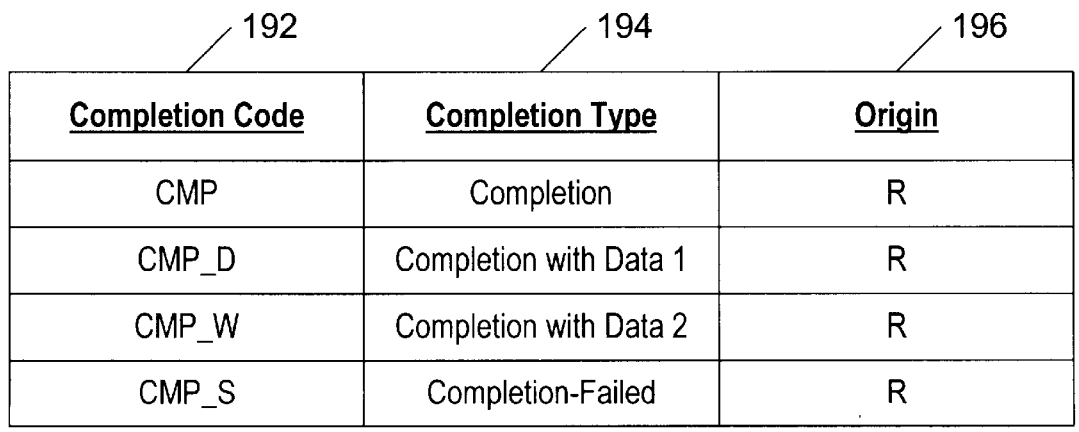
FIG. 12 is a table listing completion types according to one embodiment of the system interface.

FIG. 12 is a table 202 depicting exemplary coherency completion types according to one embodiment of computer system 10. Similar to FIGS. 9–11, FIG. 12 includes columns 192, 194, and 196 for coherency completions.

A completion without data is used as a signal from request agent 100 to home agent 102 that a particular request is complete. In response, home agent 102 unblocks the corresponding coherency information. Two types of data completions are included, corresponding to dissimilar transactions upon SMP bus 20. One type of reissue transaction involves only a data phase upon SMP bus 20. This reissue transaction may be used for I/O write and interrupt transactions, in one embodiment. The other type of reissue transaction involves both an address and data phase. Coherent writes, such as write stream and write back, may employ the reissue transaction including both address and data phases. Finally, a completion indicating failure is included for read requests which fail to acquire the requested state.

Turning next to FIG. 13, a table 210 is shown depicting coherency activity in response to various transactions upon SMP bus 20. Table 210 depicts transactions which result in requests being transmitted to other SMP nodes 12. Transactions which complete within an SMP node are not shown. A "-" in a column indicates that no activity is performed with respect to that column in the case considered within a particular row. A transaction column 212 is included indicating the transaction received upon SMP bus 20 by request agent 100. MTAG column 214 indicates the state of the MTAG for the coherency unit accessed by the address corresponding to the transaction. The states shown include the MOSI states described above, and an "n" state. The "n" state indicates that the coherency unit is accessed in NUMA mode for the SMP node in which the transaction is initiated. Therefore, no local copy of the coherency unit is stored in the requesting nodes memory. Instead, the coherency unit is transferred from the home SMP node (or an owner node) and is transmitted to the requesting processor 16 or cache 18 without storage in memory 22.

A request column 216 lists the coherency request transmitted to the home agent identified by the address of the transaction. Upon receipt of the coherency request listed in column 216, home agent 102 checks the state of the coherency unit for the requesting node as recorded in directory 66. D column 218 lists the current state of the coherency unit recorded for the requesting node, and D' column 220 lists the state of the coherency unit recorded for the requesting node as updated by home agent 102 in response to the received coherency request. Additionally, home agent 102 may generate a first coherency demand to the owner of the coherency unit and additional coherency demands to any nodes maintaining shared copies of the coherency unit. The coherency demand transmitted to the owner is shown in column 222, while the coherency demand transmitted to the sharing nodes is shown in column 224. Still further, home agent 102 may transmit a coherency reply to the requesting node. Home agent replies are shown in column 226.

The slave agent 104 in the SMP node indicated as the owner of the coherency unit transmits a coherency reply as shown in column 228. Slave agents 104 in nodes indicated as sharing nodes respond to the coherency demands shown in column 224 with the coherency replies shown in column 230, subsequent to performing state changes indicated by the received coherency demand.

Upon receipt of the appropriate number of coherency replies, request agent 100 transmits a coherency completion to home agent 102. The coherency completions used for various transactions are shown in column 232.

As an example, a row 234 depicts the coherency activity in response to a read to share transaction upon SMP bus 20 for which the corresponding MTAG state is invalid. The corresponding request agent 100 transmits a read to share coherency request to the home node identified by the global address associated with the read to share transaction. For the case shown in row 234, the directory of the home node indicates that the requesting node is storing the data in the invalid state. The state in the directory of the home node for the requesting node is updated to shared, and read to share coherency demand is transmitted by home agent 102 to the node indicated by the directory to be the owner. No demands are transmitted to sharers, since the transaction seeks to acquire the shared state. The slave agent 104 in the owner node transmits the data corresponding to the coherency unit to the requesting node. Upon receipt of the data, the request agent 100 within the requesting node transmits a coherency completion to the home agent 102 within the home node. The transaction is therefore complete.

It is noted that the state shown in D column 218 may not match the state in MTAG column 214. For example, a row 236 shows a coherency unit in the invalid state in MTAG column 214. However, the corresponding state in D column 218 may be modified, owned, or shared. Such situations occur when a prior coherency request from the requesting node for the coherency unit is outstanding within computer system 10 when the access to MTAG 68 for the current transaction to the coherency unit is performed upon address bus 58. However, due to the blocking of directory entries during a particular access, the outstanding request is completed prior to access of directory 66 by the current request. For this reason, the generated coherency demands are dependent upon the directory state (which matches the MTAG state at the time the directory is accessed). For the example shown in row 236, since the directory indicates that the coherency unit now resides in the requesting node, the read to share request may be completed by simply reissuing the read transaction upon SMP bus 20 in the requesting node. Therefore, the home node acknowledges the request, including a reply count of one, and the requesting node may subsequently reissue the read transaction. It is further noted that, although table 210 lists many types of transactions, additional transactions may be employed according to various embodiments of computer system 10.

Controller and Snooper Subnodes

Figure 14:
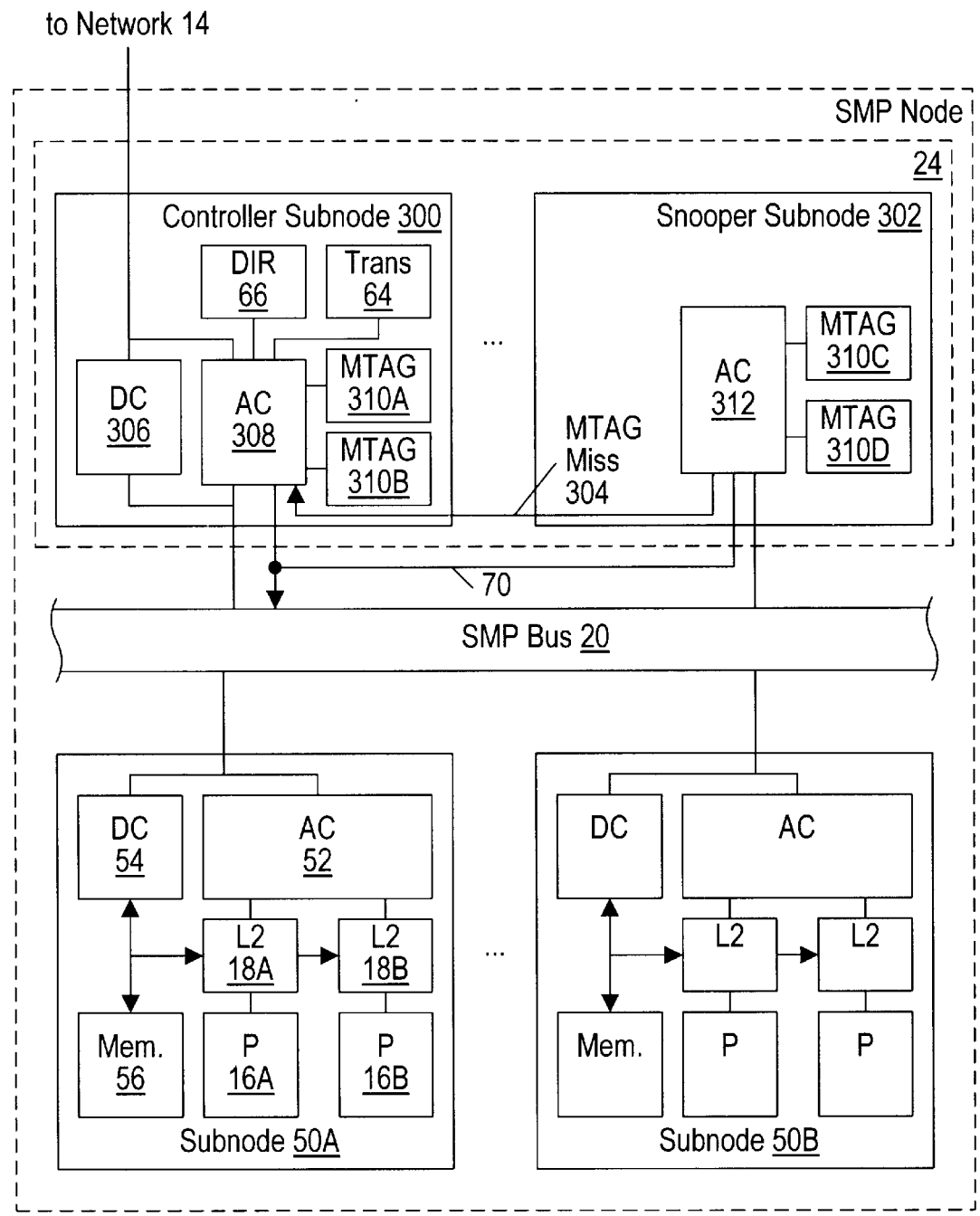
FIG. 14 is a block diagram of a second embodiment of a symmetric multiprocessing node depicted in FIG. 1.

Turning next to FIG. 14, a block diagram of one particular implementation of SMP node 12A is shown. Other implementations are contemplated as well. As shown in FIG. 14, SMP node 12A includes system interface 24 (indicated as a dashed enclosure), and subnodes 50A and 50B similar to those shown in FIG. 2. Certain implementational details from the subnodes 50A and 50B shown in FIG. 2 have been omitted in FIG. 14 for simplicity. FIG. 14 illustrates system interface 24 as multiple subnodes including a controller subnode 300 and a snooper subnode 302. Controller subnode 300 is coupled to network 14 as well as SMP bus 20, while snooper subnode 302 is coupled to SMP bus 20. An MTAG miss line 304 is coupled between snooper subnode 302 and controller subnode 300. It is noted that MTAG miss line(s) 304 and ignore signal 70 are broadcast signals available upon SMP bus 20, shown separately in FIG. 14 for clarity.

Generally speaking, controller subnode 300 is configured to effect communication between SMP node 12A and network 14. Snooper subnode 302 is configured to store additional MTAG data. Various configurations of SMP node 12A may include zero or more snooper subnodes 302, depending upon the amount of memory included in memory portions 56 of subnodes 50 as well as the number of memory modules which may be configured upon a controller or snooper subnode for use in storing MTAG data. In one embodiment, up to three snooper subnodes 302 may be included in an SMP node 12A–12D. In one particular embodiment, controller subnode 300 and snooper subnodes 302 each comprise separate printed circuit boards which may be inserted into a backplane comprising SMP bus 20 (similar to the discussion of FIG. 2 for subnodes 50A and 50B). As used herein, the term subnode is used to indicate a block of logic circuitry which implements a portion of a larger function. For example, controller subnode 300 and snooper subnode (s) 302 implement one embodiment of system interface 24.

Controller subnode 300 includes a data controller 306 and an address controller 308. Data controller 306 may include input and output data queues 88 and 90 as shown in FIG. 3, as well as control logic for managing the queues. Address controller 308 may comprise request agent 100, home agent 102, and slave agent 104 as well as the remaining input and output queues shown in FIG. 3 and transaction filter 98. Coupled to address controller 308 is directory 66, translation storage 64, and multiple MTAG storages 310A and 310B. MTAG storages 310A and 310B comprise a portion of MTAG 68 as shown in FIG. 3. Additional MTAG storages 310C and 310D are included in snooper subnode 302. Snooper subnode 302 further includes an address controller 312.

The MTAG corresponding to a particular coherency unit is stored in one of MTAG storages 310. When a transaction is presented upon SMP bus 20, each subnode 300 or 302 determines if the MTAG corresponding to the coherency unit affected by the transaction is stored therein, and the subnode which is storing the MTAG responds with an appropriate assertion or deassertion of ignore signal 70. If the access rights stored in the MTAG indicate that the transaction may proceed, ignore signal 70 is deasserted. Conversely, if the access rights stored in the MTAG indicate that coherency activity must first be performed upon network 14, ignore signal 70 is asserted.

In addition to asserting ignore signal 70 when appropriate, snooper subnode 302 asserts the MTAG miss signal upon MTAG miss line 304. Controller subnode 300 detects the assertion of MTAG miss line 304 and is thereby informed that ignore signal 70 is being asserted because the MTAG corresponding to the transaction indicates that insufficient access rights to complete the transaction are maintained by the SMP node. For example, a write transaction to a coherency unit for which read-only access rights are maintained would result in assertion of ignore signal 70 and MTAG miss line 304. MTAG miss line 304 is included because ignore signal 70 may be asserted by other devices attached to SMP bus 20 for other reasons. Controller subnode 300 distinguishes between the MTAG miss reason (for which coherency activities may be initiated to prefetch the affected coherency unit, according to one embodiment) and other reasons (such as a device having insufficient storage space in an in queue for the transaction).

In one embodiment, each of MTAG storages 310 comprise a bank of SRAM modules. The number of SRAM modules per bank may vary within the constraints imposed upon the access time to MTAG storages 310. If too many SRAM modules are included in a bank, the capacitive load upon the signal lines which communicate between MTAG storages 310 and address controller 308 may cause the access time of the storage to increase to the point that MTAG access cannot be completed in time to properly assert/deassert ignore signal 70. In addition to varying the number of SRAM modules included, the SRAM technology level may be varied. The amount of MTAG storage included in a bank is thus variable dependent upon the SRAM technology selected.

The capacitive load problem described above is also the motivation for providing separate communicative paths between each of MTAG storages 310 and the corresponding address controller 308 or 312. However, the separate communicative paths increase the number of signals received by address controllers 308 and 312. Since address controllers 308 and 312 are generally packaged separate from MTAG storages 310, the number of signal lines available is limited by the packaging. Therefore, multiple subnodes are provided for expanding MTAG 68 to the size needed for a given amount of memory 22 (formed by memory portions 56).

Upon assertion of ignore signal 70 (and receipt of an asserted MTAG miss signal if the access rights to the coherency unit are stored in snooper subnode 302), controller subnode 300 initiates coherency activity upon network 14 to obtain the access rights needed for the ignored transaction. An exemplary set of coherency activity is described in FIG. 13 above. Upon completion of the coherency activity, controller subnode 300 performs a reissue transaction upon SMP bus 20. The MTAG corresponding to the affected coherency unit is updated concurrently, such that a subsequent transaction upon SMP bus 20 detects the access rights accorded to SMP node 12A in response to the coherency activity. In one embodiment, the updated MTAG is transmitted as a part of the address phase of the reissue transaction, as will be explained in further detail below.

As used herein, a reissue transaction is a transaction performed as a result of performing coherency activity with respect to an ignored transaction. The reissue transaction causes completion of the ignored transaction within SMP node 12A. In one embodiment, SMP bus 20 is a tagged split-transaction bus in which an address phase and the corresponding data phase are identified by a tag assigned by the initiator of the address phase of the transaction. For such an embodiment, the reissue transaction generally uses the tag (or transaction ID) of the ignored transaction. However, in the case in which data is returned for a second transaction out of order with respect to a first transaction from the same SMP node 12A–12D, controller subnode 300 may perform a reissue transaction for the second transaction using a tag assigned by controller subnode 300. When the first transaction has completed, controller subnode 300 may then reissue the second transaction using the original tag in order to complete the second transaction. The act of performing a reissue transaction is referred to herein as "reissuing".

Address controller 312 interfaces to SMP bus 20, manages MTAG storages 310C and 310D, and asserts MTAG miss signal 304 when asserting ignore signal 70. Therefore, the functionality required of address controller 312 is a subset of the functionality required of address controller 308. Address controller 312 may include only the functionality needed to manage MTAG storages 310 and to respond to accesses to the coherency units represented therein. Alternatively, address controller 312 may be identical to address controller 308. A configuration register included within address controller 312 may be set such that address controller 312 operates as a snooper subnode 302 instead of a controller subnode 300. Still further, snooper subnode 302 may be identical to controller subnode 300. However, due to a configuration register setting indicating that the subnode is a snooper subnode, portions of the subnode may remain idle during operation.

It is noted that MTAG 68, as formed by MTAG storages 310 shown in FIG. 14, collectively form a table of coherency states for the memory locations stored in memory 22. Generally speaking, a table of coherency states may be constructed in any manner as long as a particular address consistently uses a particular coherency state within the table of coherency states to determine the current access rights of the SMP node to the data stored at the particular address.

Figure 15:
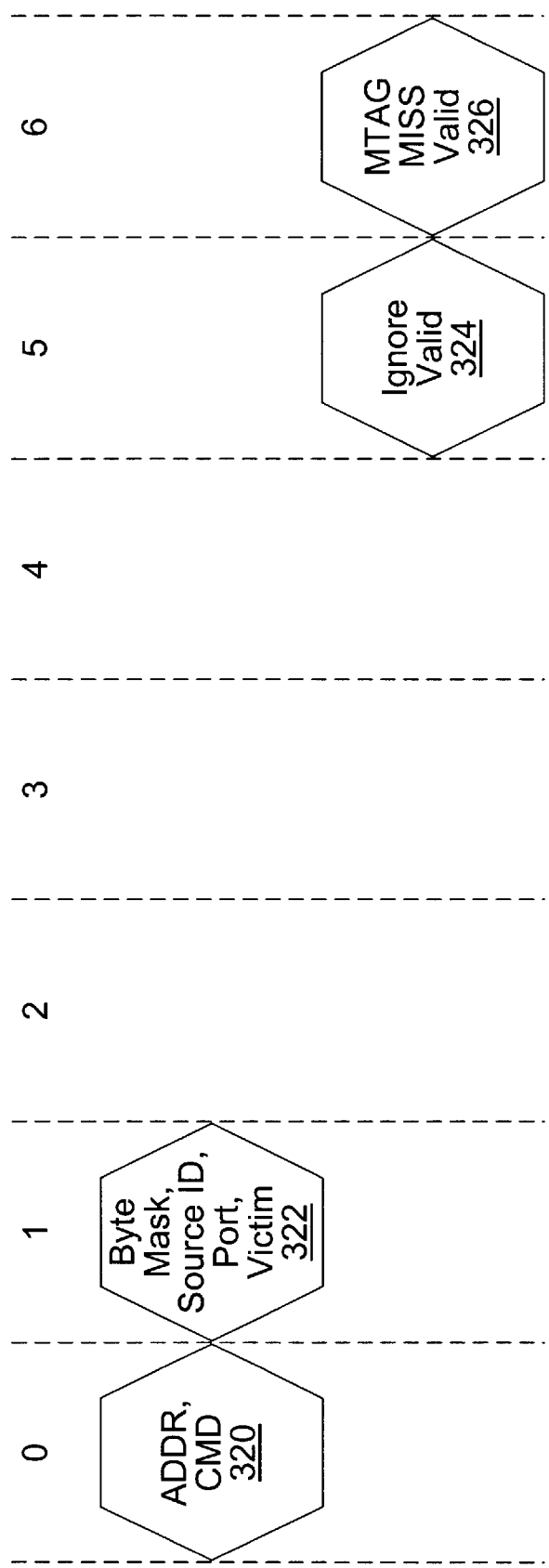
FIG. 15 is a timing diagram depicting a portion of a transaction upon a bus of the symmetric multiprocessing node shown in FIG. 14.

Turning now to FIG. 15, a timing diagram is shown depicting an address phase of a transaction upon SMP bus 20 according to one embodiment of SMP node 12A. Other embodiments may include dissimilar or similar address phase definitions. Multiple consecutive bus clock cycles are shown, labeled 0 through 5 and delimited by vertical dashed lines. For the embodiment shown, the address phase of a transaction includes a first address phase 320 and a second address phase 322. First address phase 320 and second address phase 322 occur in consecutive bus clock cycles 0 and 1, respectively. The same set of lines upon address bus 58 of SMP bus 20 are used to convey the information sent in address phases 320 and 322.

During first address phase 320, the address of the transaction is conveyed, as well as a command which indicates the nature of the transaction (e.g. read to share, read to own, etc.). Second address phase 320 conveys additional information regarding the transaction. In particular, second address phase 320 includes a bytemask field, a sourceID field, a port field, and a victim field. The sourceID field is used to convey the aforementioned tag or transaction ID. Subsequently, the tag may be used to identify a corresponding data transaction or reissue transaction. The tag assigned to a particular transaction is not reassigned to another transaction until the particular transaction completes. Therefore, the tag uniquely identifies a given transaction upon SMP bus 20. The port field indicates which processor 16 within a subnode 50 is the originator of a particular transaction. The victim field comprises a bit indicative, when set, that the transaction is displacing a modified line in a cache internal to the processor 16 or the external cache 18 corresponding to the processor 16. The victim field may be used as an early warning that a copyback is to occur from the processor 16.

The bytemask field is used for I/O transactions to identify the bytes which are being transferred. In one embodiment, the bytemask field comprises 16 bits. Each bit corresponds to a particular byte within the bytes transferable upon data bus 60 (part of SMP bus 20). If the bit is set, the corresponding byte is transferred. Additionally, the bytemask field is used by reissue transactions to transmit MTAG update information to the snooper subnode 302 which stores the MTAG for the coherency unit affected by the reissue transaction. Snooper subnodes 302 capture the address of the reissue transaction during first address phase 320 and determine if the address corresponds to an MTAG within the MTAG storages 310 associated therewith. If the address does correspond to an MTAG managed by the snooper subnode 302, then the updated MTAG state information is captured from the bytemask field during second address phase 322. Subsequently, the corresponding MTAG is updated.

FIG. 15 further illustrates the bus clock cycle in which ignore signal 70 and MTAG miss signal 304 are valid upon SMP bus 20 for one embodiment. The bus clock cycle in which the signals are valid is the bus clock cycle in which the signals are captured by controller subnode 300 (and other devices upon SMP bus 20 in the case of ignore signal 70). According to the illustrated embodiment, the ignore signal is valid in bus clock cycle 5 (reference number 324) while the MTAG miss signal is valid in bus clock cycle 6 (reference number 326). For the illustrated embodiment, the same physical wire is used for both the MTAG miss and the ignore signals. Other embodiments may employ dissimilar wires for the two signals, and such embodiments may define the MTAG miss signal as valid in bus clock cycle 5 (along with the ignore signal).

Figure 16:
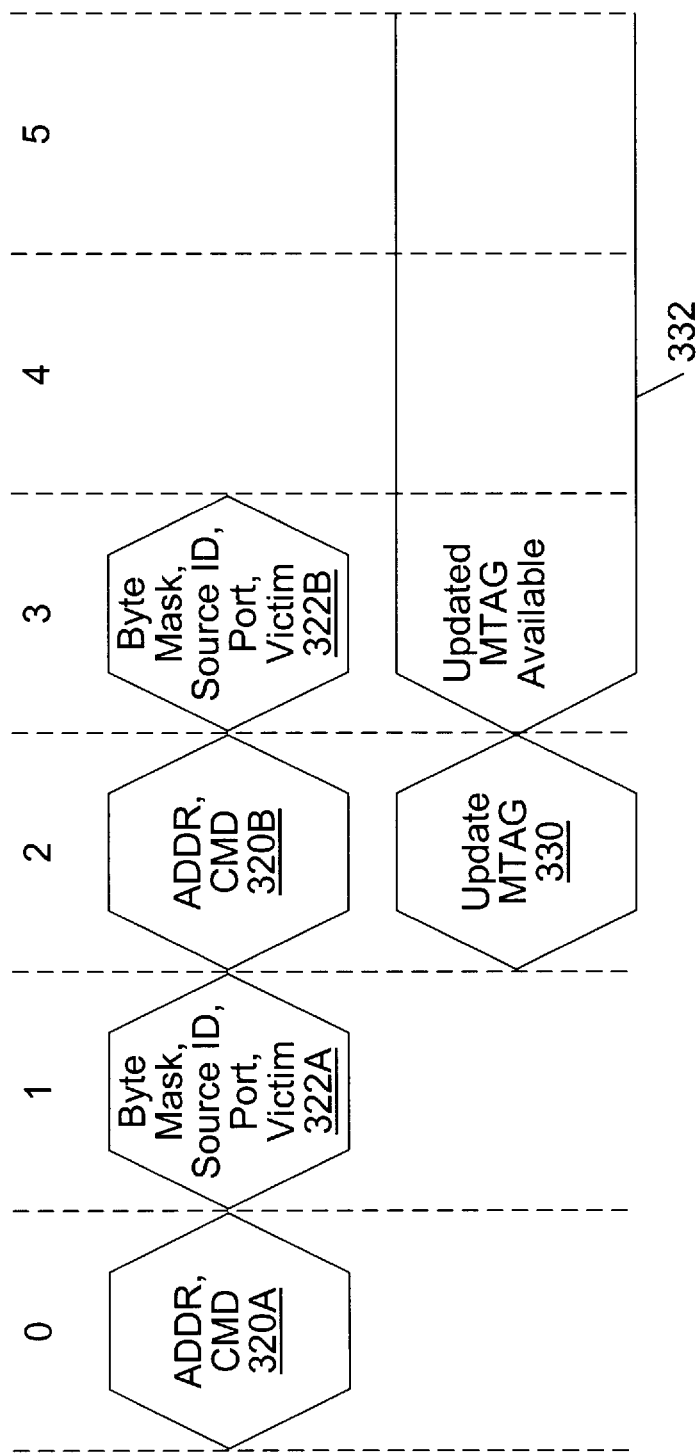
FIG. 16 is a timing diagram depicting a portion of two transactions upon the bus of the symmetric multiprocessing node shown in FIG. 14, highlighting update of an MTAG state with respect to the first of the two transactions.

FIG. 16 is another timing diagram illustrating address phases of two transactions. A first transaction is represented by a first address phase 320A and a second address phase 322A. Similarly, a second transaction is represented by a first address phase 320B and a second address phase 322B. For the example of FIG. 16, the first address transaction is a reissue transaction which carries an update to the MTAG state. The second address transaction is performed in response to activity in a different processor 16 than the processor 16 which originated the transaction corresponding to the reissue transaction. Additionally, the transactions affect the same coherency unit. Therefore, the MTAG state updated by the first transaction should be detected as the MTAG state of the second transaction.

The snooper subnode 302 which stores the MTAG being updated captures the address and bytemask field from first address phase 320A and second address phase 322A, respectively. During bus clock cycle 2, the information for updating the MTAG has been received, and therefore the update may begin (reference number 330). Subsequently, the updated MTAG becomes available for reference by other transactions (reference number 332). As shown in FIG. 16, one bus clock cycle is used to update the MTAG. However, multiple bus clock cycles may elapse during the update of the MTAG, as long as the updated MTAG may be examined in response to subsequent address transactions and the appropriate ignore and MTAG miss assertions determined prior to the corresponding valid time for these signals.

As shown in FIG. 16, even if address transactions to the same coherency unit are performed during consecutive bus clock cycles, the updated MTAG state is available for examination. In this manner, each transaction is provided with the correct MTAG state despite the fact that the MTAG state may be stored in one of several subnodes 300 and 302.

Figure 17:
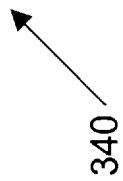
FIG. 17 is a diagram depicting fields of a bytemask transmitted upon the bus of the symmetric multiprocessing node shown in FIG. 14, according to one embodiment of the symmetric multiprocessing node.

Turning next to FIG. 17, a diagram depicting fields within an exemplary bytemask field 340 is shown. Bytemask field 340 may be coded in alternative formats for other embodiments. According to one embodiment of SMP node 12A, bytemask field 340 is encoded as shown in FIG. 17 for reissue transactions. For other cacheable (e.g. non-I/O) transactions, bytemask field 340 is coded to binary zeros. It is noted that the bytemask field 340 as described here is valid for non-I/O transactions. A dissimilar encoding is used for I/O transactions (described above).

Bytemask field 340 includes a prefetch (P) bit 342, an original source ID field 344, an agent field 346, a change state bit 348, a new state field 350, an origin bit 352, and an immune bit 354. P bit 342, original source ID field 344, and agent field 346 are provided as informational fields which are not actually interpreted by the devices attached to SMP bus 20. Instead, the informational fields may be useful when debugging, for example.

P bit 342 is set if the transaction is performed as a prefetch transaction. According to one embodiment of computer system 10, if a second transaction is presented by a subnode 50 from which a previous first transaction has been ignored, the second transaction is ignored as well. However, system interface 24 may prefetch the coherency unit affected by the second transaction if MTAG miss signal 304 is asserted as well. Original source ID field 344 encodes the tag of the original transaction corresponding to the reissue transaction being performed. Additionally, the source of the reissue transaction is encoded in agent field 346. The source agent may be the request agent 100, home agent 102, slave agent 104, or possibly other devices upon SMP bus 20 in other embodiments.

Change state bit 348, new state field 350, origin bit 352, and immune bit 354 are employed by snooper subnode 302 to detect MTAG state updates corresponding to a reissue transaction. Origin bit 352 is set for reissue transactions, indicating that the transaction is originating from controller subnode 300. Origin bit 352 is treated as a valid bit by snooper subnode 302 to detect that the transaction being performed is a reissue transaction. If the bit is clear, then the remainder of bytemask field 340 is invalid. Change state bit 348 is indicative, when set, that the MTAG value associated with the coherency unit affected by the transaction requires updating. If snooper subnode 302 detects that change state bit 348 and origin bit 352 are set, then snooper subnode 302 updates the corresponding MTAG. The new state for the MTAG (i.e. the updated state) is coded in new state field 350. In one embodiment, each MTAG comprises two bits and therefore new state field 350 comprises two bits.

Finally, immune bit 354 is set for reissue transactions to indicate that the transaction is immune to assertions of ignore signal 70. Snooper subnode 302 uses this bit to inhibit assertion of ignore signal 70 due to detection of an MTAG miss. For example, if a coherency unit is accessed by a read to share transaction and the MTAG indicates invalid, then the snooper subnode asserts the ignore signal. Since the reissue transaction is generally coded with the same command as the original transaction, the snooper subnode 302 would assert the ignore signal again when the transaction is reissued. However, the assertion is inhibited by immune bit 354.

Figure 18:
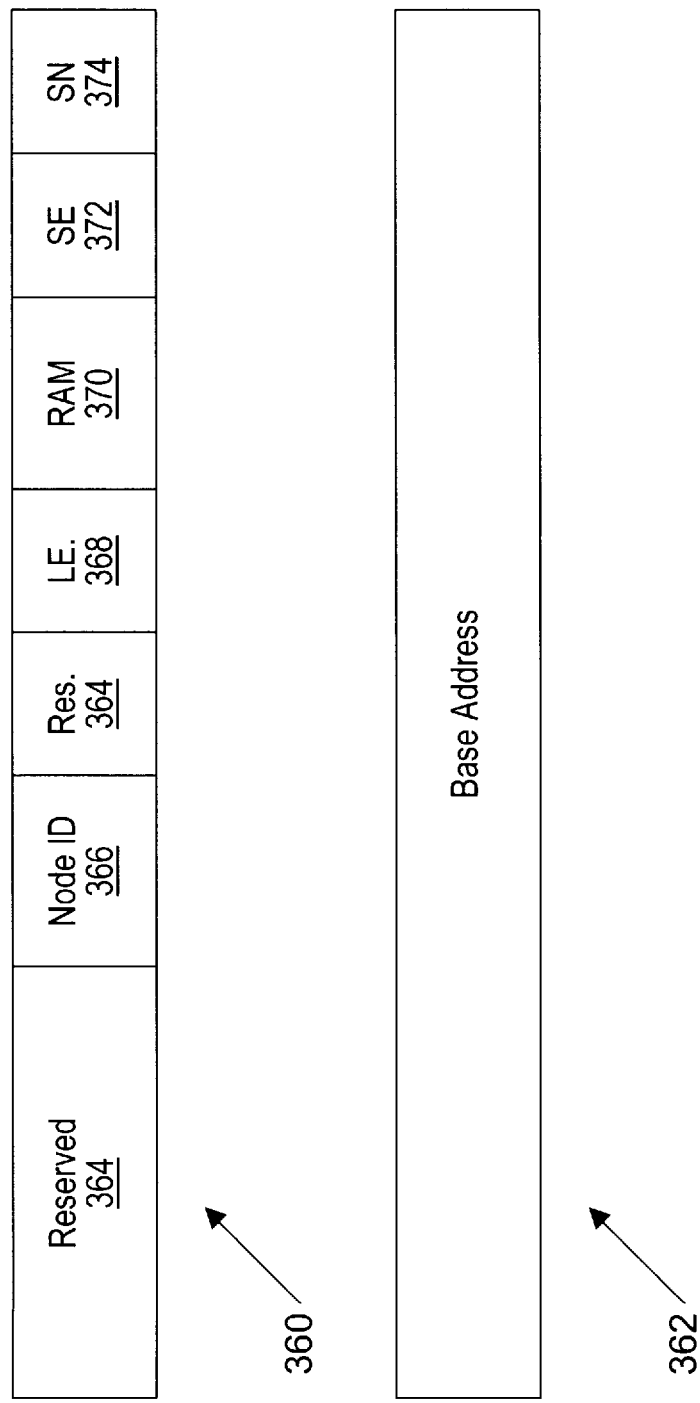
FIG. 18 is a diagram of control registers employed in one embodiment of the symmetric multiprocessing node shown in FIG. 14.

Turning now to FIG. 18, a diagram of configuration registers 360 and 362 which may be included within one embodiment of address controllers 308 and 312 are shown. Configuration register 360 includes a reserved field 364, a node ID field 366, an LE field 368, a RAM field 370, an SE field 372, and an SN field 374. Configuration register 362 comprises a base address which identifies a local physical address at which MTAG coverage begins. In other words, addresses which are less than the base address stored in configuration register 362 do not have a corresponding coherency state within MTAG 68. Such memory addresses may be used by processors within the local SMP node for private storage (e.g. memory locations which are not shared with other SMP nodes 12A–12D).

Reserved field 364 is reserved for potential future expansion of the functionality of address controllers 308 and 312. Typically, the value of reserved field 364 is set to zero. Node ID field 366 stores the node ID of the SMP node 12A–12D into which the address controllers 308 and 312 are configured. LE field 368 is used for testing purposes. The LE field comprises a bit which, when set, disables any shortcuts between agents within the node (i.e. if an agent within the node needs to communicate with another agent within the node, the communication is effected via a packet sent upon network 14).

RAM field 370 indicates the SRAM technology employed to form MTAG storages 310. In one embodiment, RAM field 370 includes two bits which may be encoded to identify SRAM technologies of 1 Megabit, 2 Megabit, 4 Megabit, and 16 Megabit. SE field 372 indicates the controller/ snooper role for which the address controllers 308 and 312 are configured. SE field 372 comprises a bit indicative, when set, that the address controller is performing the snooper role (e.g. it is configured into a snooper subnode 302). Alternatively, if the bit is clear then the address controller is performing a controller role (e.g. it is configured into controller subnode 300). SN field 374 is interpreted depending upon the value of SE field 372. If SE field 372 indicates that the address controller is in controller mode, then SN field 374 indicates the number of snooper subnodes included within the SMP node. If SE field 372 indicates that the address controller is in snooper mode, then SN field 374 indicates which snooper number is assigned to the snooper subnode 302 including that address controller. In one embodiment, computer system 10 supports up to three snooper subnodes 302 within an SMP node 12. For such an embodiment, SN field 374 comprises two bits.

Figure 19:
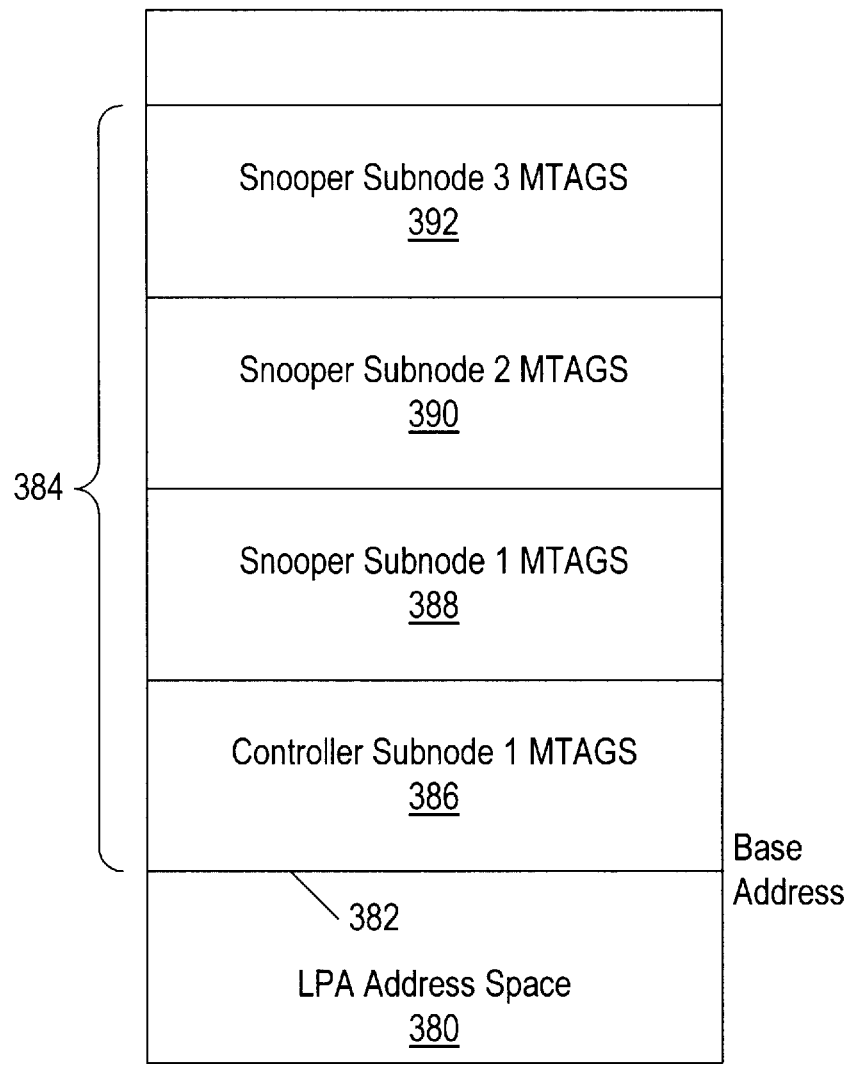
FIG. 19 is a diagram of an address space of one embodiment of the symmetric multiprocessing node shown in FIG. 14.

The base address stored in configuration register 362, RAM field 370, SE field 372, and SN field 374 are used by address controllers 308 and 312 to determine the location of the MTAG for a given address, as illustrated in FIG. 19. FIG. 19 is a diagram of an LPA address space 380. Address 0 of address space 380 is at the bottom of LPA address space 380 as depicted in FIG. 19, while the maximum address within address space 380 is at the top of LPA address space 380.

Addresses less than the base address stored in configuration register 362 do not have a coherency state stored in MTAG 68. Therefore, address controllers 308 and 312 ignore addresses less than the base address. The base address is indicated in FIG. 19 via a horizontal line within address space 380 (reference number 382). An area 384 of address space 380 is divided into four equal sized portions 386, 388, 390, and 392. Any remaining addresses within address space 380 which are greater than addresses within portion 392 also do not have a corresponding coherency state within MTAG 68. The size of portions 386, 388, 390, and 392 is determined by the SRAM technology coded into RAM field 370. Each MTAG comprises two bits, and therefore a given SRAM technology implies a number of MTAGs which may be stored in a given SRAM of that technology.

As noted on FIG. 19, the MTAGs corresponding to portion 386 are stored in controller subnode 300, while portions 388, 390, and 392 are stored in snooper subnodes 302. The snooper subnode 302 having an address controller whose configuration register 360 has SN field 374 coded to 01 (in binary) stores MTAGs corresponding to portion 388 of memory space 380. Similarly, snooper subnodes 302 for which the corresponding SN fields 374 are coded to 10 and 11 (in binary) store MTAGs corresponding to portions 390 and 392 of memory space 380, respectively.

When an address is presented upon SMP bus 20, the controller subnode 300 and each snooper subnode 302 determine if the address lies within the portion of address space 380 covered by the MTAGs stored within that subnode. If the address does lie within the portion assigned to that subnode, that subnode does not respond via ignore signal 70 and MTAG miss signal 304. On the other hand, if the address does lie within the portion assigned to that subnode, that subnode accesses the corresponding MTAG value. If the coherency state stored therein indicates sufficient access rights for the transaction, the subnode does not assert the ignore signal 70. Alternatively, if the coherency state stored therein indicates insufficient access rights for the transaction, the subnode asserts ignore signal 70 (and MTAG miss signal 304).

FIG. 20 depicts an exemplary configuration of an MTAG entry 400, as well as a table 402 listing an exemplary MTAG encoding which may be employed by one embodiment of computer system 10. MTAG entry 400 comprises 33 bits, and is the amount of data transferred between an MTAG storage 310 and the corresponding address controller 308 or 312. Because each coherency state is coded into two bits, 16 MTAGs are stored in each MTAG entry 400 (labeled M0–M15 in FIG. 20). Additionally, a parity bit (labeled P in FIG. 20) is included in the entry. The parity bit is an odd parity of the 32 bits of MTAGs in the entry 400. Because the entry 400 is parity protected, the entire entry 400 is written when at least one MTAG therein is updated.

Referring back to FIG. 16, the original 33 bits of data including an MTAG to be updated are read during bus clock cycle 2 (reference number 330). The specified MTAG is modified and a new parity is calculated. Subsequently, the MTAG is stored back into the MTAG storage 310. If an access to one of the 16 MTAGs in the modified entry is performed prior to storing the modified entry into MTAG storage 310, the updated copy of the information within the controller subnode is used.

A particular MTAG may be located by subtracting the numerically smallest address within a portion 386, 388, 390, or 392 from the address and using the result value as an index into the MTAG storage 310 incorporated into the corresponding subnode. A portion of the result value is used as an index. For example, in one embodiment each coherency unit is 64 bytes. Therefore, the least significant six bits of the address are an offset within the coherency unit. The next least significant four bits identify one of the sixteen MTAGs within MTAG entry 400. Therefore, the remaining bits of the result value (i.e. not including the offset within the coherency unit nor the bits used to select one of the MTAGs within the MTAG entry) are used to locate the MTAG entry 400.

Table 402 depicts one exemplary MTAG encoding, although any MTAG encoding may be used. The exemplary MTAG encoding is suitable for use in cases in which the coherency states are defined via the MOSI coherence protocol.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

In accordance with the above disclosure, a computer system has been described which allows flexibility in expanding the amount of shared memory which is included in a processing node of the computer system. Coherency state memory may be added or removed from the computer system as desired via insertion or deletion of snooper subnodes. The computer system includes a mechanism for updating coherency state information concurrent with reissue of a transaction, despite the fact that the coherency state information may be stored within a snooper subnode. Advantageously, the computer system may be flexibly configured and upgraded as a user's needs dictate.

Numerous variations and modifications will become apparent to those skilled in the art once the above disclosure is fully appreciated. For example, although various blocks and components shown herein have been described in terms of hardware embodiments, alternative embodiments may implement all or a portion of the hardware functionality in software. It is intended that the following claims be interpreted to embrace all such variations and modifications.

What is claimed is:

1. A method for completing a transaction in a processing node of a multiprocessing computer system, comprising:

reissuing said transaction within said processing node upon completion of coherency activity performed with respect to said transaction;

broadcasting within said processing node a coherency state corresponding to a coherency unit affected by said transaction concurrent with said reissuing; and recording said coherency state in a position within a table of coherency states within said processing node, wherein said position corresponds to said coherency unit.

2. The method as recited in claim 1 wherein said coherency state is indicative of an access right accorded to said processing node with respect to said coherency unit.

3. The method as recited in claim 1 wherein said reissuing is performed upon a bus within said processing node.

4. The method as recited in claim 3 wherein said broadcasting is initiated and delivered upon said bus within said processing node.

5. The method as recited in claim 4 wherein said reissuing is performed by a first subnode within said processing node, wherein said first subnode is configured to communicate between said processing node and other processing nodes within said multiprocessing computer system.

6. The method as recited in claim 5 wherein said broadcasting is performed by said first subnode.

7. The method as recited in claim 6 wherein said recording is performed by a second subnode coupled to said bus, wherein said second subnode includes a first processing unit, a first memory unit, and a first cache unit.

8. The method as recited in claim 7 further comprising issuing a second transaction affecting said coherency unit subsequent to said reissuing, wherein said second subnode responds in accordance with said coherency state received in said recording, wherein said second subnode includes a first processing unit, a first memory unit, and a first cache unit.

9. A system interface comprising:

a first subnode configured to communicate between a local bus of a processing node and a network, and configured to store a first plurality of coherency states corresponding to a first plurality of coherency units; and a second subnode coupled to said local bus, wherein said second subnode is configured to store a second plurality of coherency states corresponding to a second plurality of coherency units stored within said processing node, wherein said first subnode and said second subnode each include a first processing unit, a first memory unit, and a first cache unit.

10. The system interface as recited in claim 9 further comprising a third subnode configured to store a third plurality of coherency states corresponding to a third plurality of coherency units stored within said processing node.

11. The system interface as recited in claim 9 wherein said first subnode is further configured to reissue a transaction on said local bus upon completion of coherency activity associated with said transaction via said network, and wherein said first subnode is further configured to concurrently broadcast a coherency state corresponding to a coherency unit affected by said transaction on said local bus.

12. The system interface as recited in claim 11 wherein said second subnode is further configured to capture and store said coherency state if said coherency unit is one of said first plurality of coherency units.

13. The system interface as recited in claim 11 wherein said transaction comprises a first address phase and a second address phase.

14. The system interface as recited in claim 13 wherein said first address phase and said second address phase are performed on consecutive bus clock cycles.

15. The system interface as recited in claim 14 wherein said second address phase includes said coherency state.

16. The system interface as recited in claim 15 wherein said coherency state is specified via a bytemask field of said second address phase.

17. The system interface as recited in claim 16 wherein said bytemask includes an indicate that said transaction is immune to assertion of an ignore signal upon said local bus.

18. The system interface as recited in claim 9 wherein said second subnode is configured to assert an ignore signal if a transaction is performed and a corresponding coherency state stored within said second subnode indicates that said processing node has insufficient access rights to an affected coherency unit.

19. The system interface as recited in claim 18 wherein said second subnode is further configured to assert a second signal upon a second signal line coupled to said first subnode, and wherein said second signal informs said first subnode that said second subnode is asserting said ignore signal.

20. A computer system comprising:
   a network; and
   a first processing node coupled to said network, said first processing node including:
   a first controller subnode configured to effectuate communication upon said network and to reissue a transaction for which said communication is effectuated upon completion of said communication, and further to broadcast a coherency state achieved via said communication; and
   a first snooper subnode configured to store a first plurality of coherency states corresponding to a first plurality of coherency units stored within said first processing node, wherein said first snooper subnode is configured to capture said coherency state broadcast by said first controller subnode if said coherency state is one of said plurality of coherency states, wherein said first controller subnode and said first snooper subnode each includes a first processing unit, a first memory unit, and a first cache unit.

21. The computer system as recited in claim 20 wherein said controller subnode is configured to store a second plurality of coherency states corresponding to a second plurality of coherency units.

* * * * *